United States Patent
Jang et al.

(10) Patent No.: US 11,086,449 B2
(45) Date of Patent: Aug. 10, 2021

(54) DRIVING CIRCUIT, TOUCH DISPLAY DEVICE, AND DRIVING METHOD THEREOF

(71) Applicant: LG Display Co., Ltd., Seoul (KR)

(72) Inventors: Hoon Jang, Paju-si (KR); WonYong Jang, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/917,584

(22) Filed: Jun. 30, 2020

(65) Prior Publication Data

US 2021/0004103 A1 Jan. 7, 2021

(30) Foreign Application Priority Data

Jul. 3, 2019 (KR) .......................... 10-2019-0080324

(51) Int. Cl.
*G06F 3/041* (2006.01)
*G06F 3/044* (2006.01)
*G09G 3/36* (2006.01)

(52) U.S. Cl.
CPC ........ *G06F 3/04184* (2019.05); *G06F 3/0412* (2013.01); *G06F 3/0445* (2019.05); *G09G 3/3655* (2013.01)

(58) Field of Classification Search
CPC ........... G06F 3/041–047; G06F 3/0412; G06F 3/04184; G06F 3/0418; G06F 3/0416; G06F 2203/04107; G06F 3/04166; G06F 3/044; G06F 3/0445; G09G 3/3648; G09G 3/3696; G09G 3/3655; G09G 2320/0242; G09G 2320/0247
See application file for complete search history.

(56) References Cited

U.S. PATENT DOCUMENTS

2004/0239667 A1 * 12/2004 Takahashi ............ G09G 3/3655
345/212
2018/0188865 A1 * 7/2018 Jang ..................... G06F 3/04184

* cited by examiner

*Primary Examiner* — Sanjiv D. Patel
(74) *Attorney, Agent, or Firm* — Seed IP Law Group LLP

(57) ABSTRACT

Provided are a driving circuit, a touch display device, and a driving method thereof. The effect of an offset to a touch driving signal and a load-free driving signal during a load-free driving process is reduced. Deviations in the amplitude between the touch driving signal and the load-free driving signal are reduced.

11 Claims, 14 Drawing Sheets

DRIVING CIRCUIT, TOUCH DISPLAY DEVICE, AND DRIVING METHOD THEREOF

CROSS REFERENCE TO RELATED APPLICATION

This application claims priority from Korean Patent Application No. 10-2019-0080324, filed on Jul. 3, 2019, which is hereby incorporated by reference for all purposes as if fully set forth herein.

BACKGROUND

Technical Field

Embodiments relate to a driving circuit, a touch display device, and a driving method thereof.

Description of the Related Art

Along with the development of multimedia, the importance of flat display devices is increasing. In this regard, flat display devices, such as liquid crystal display (LCD), plasma display panel (PDP), and organic light-emitting display (OLED), have been made commercially available. Among such flat display devices, liquid crystal display has come into widespread use as mobile flat display devices, due to merits thereof, such as high image quality, light weight, and low power consumption. In particular, liquid crystal display has been used in a variety of forms in notebook computers, computer monitors, TVs, and the like.

Touch display devices respectively provided by stacking a touchscreen panel on such a liquid crystal display is widely used. When the touchscreen panel is touched by a finger, a stylus pen, or the like, touch display devices may detect a touch point on the basis of a change in electric characteristics, such as resistance or capacitance, of the touch point, thereby outputting information corresponding to the touch point or performing a calculation (or operation) corresponding to the touch point. Such touch display devices are one type of user interface, and applications thereof are increasingly being applied to small portable terminals, office devices, mobile devices, and the like.

BRIEF SUMMARY

However, such a touch display device, fabricated by stacking a separate touchscreen panel on a display panel, may have the following problems. The stacked touchscreen panel may increase the thickness of the touch display device, thereby making it difficult to fabricate such a touch display device to have a thinner profile. The transmission efficiency of light may be reduced by the stacked touchscreen panel. In addition, fabrication costs may be increased. To overcome such problems, advanced in-cell touch (AIT) type display devices respectively including touch electrodes embedded in pixel areas thereof have recently been proposed.

In such a touch display device, common electrodes (CEs) for the driving of respective pixels are also used as touch sensing electrodes. Accordingly, a common voltage Vcom is provided to thin-film transistors (TFTs) during a display period, and a touch driving signal TDS is provided to the common electrodes CEs operating as touch electrodes during a touch sensing period.

Here, parasitic capacitance is generated between the touch electrodes and the pixels, due to coupling. To reduce this effect, time division driving method may be used by dividing a time corresponding to a one-frame period into a display period in which the pixels are driven and a touch sensing period in which the touch electrodes are driven.

In particular, when the parasitic capacitance between the touch electrodes and the pixels increases, touch sensitivity and accuracy of touch recognition may be reduced. To reduce such effects, load-free driving (LFD) method may be used.

The load-free driving method is a method of supplying an alternating signal, the phase and amplitude of which are the same as those of the touch driving signal TDS, to the data lines and the gate lines of the display panel during the touch sensing period, so as to reduce the effect of the parasitic capacitance of the touch electrodes on the touch sensing.

During the display period, the load-free driving method supplies a gate pulse comprised of a gate high voltage VGH and a gate low voltage VGL to the gate lines while supplying a data voltage Vdata of an image signal input to the data lines. During the touch sensing period, the load-free driving method supplies an alternating signal synchronous with the touch driving signal TDS to the data lines and the gate lines.

In a case in which the load-free driving method is used, the touch driving signal TDS and the alternating signal having the same phase and amplitude are applied to both ends with the parasitic capacitance, so that the effects caused by parasitic capacitance may be excluded. This is because the voltage between the parasitic capacitance changes simultaneously and the amount of electric charge charged by the parasitic capacitance is reduced with decreases in the difference of the voltages. Theoretically, when load-free driving method is used, the amount of electric charge charged by the parasitic capacitance is 0, and thus, a load-free effect without parasitic capacitance may be obtained.

The effect of the load-free driving method may be obtained when the phase and amplitude of the touch driving signal TDS are completely the same as those of the alternating signal.

However, the touch display device is provided with a plurality of amplifiers and a multiplexer to generate the touch driving signal TDS and the alternating signal, and offsets present in the amplifiers may cause deviations in the amplitude between the touch driving signal TDS and the alternating signal.

In particular, since the touch driving signal TDS and the alternating signal are generated independently of each other, the offset in the amplifiers for generating the touch driving signal TDS and the offset in the amplifiers for generating the alternating signal may increase the deviations between the touch driving signal TDS and the alternating signal, thereby degrading the performance of touch recognition.

In particular, in a touch display device using an active stylus, it is more important to minimize (or reduce) the amplitudes of the touch driving signal TDS and the alternating signal in order to minimize (or reduce) stylus noise.

Embodiments of the present disclosure may provide a driving circuit, a touch display device, and a driving method thereof, in which the effect of an offset to a touch driving signal and a load-free driving signal during a load-free driving process may be diminished to reduce deviations in the amplitude between the touch driving signal and the load-free driving signal.

In addition, embodiments of the present disclosure may provide a driving circuit, a touch display device, and a driving method thereof, in which a circuit is configured such that a touch driving signal and a load-free driving signal may have a dependent relationship to reduce deviations in amplitude between the touch driving signal and the load-free driving signal.

In addition, embodiments of the present disclosure may provide a driving circuit, a touch display device, and a driving method thereof, in which deviations in amplitude between a touch driving signal and a load-free driving signal may be reduced by trimming of the touch driving signal and the load-free driving signal.

According to an aspect, embodiments may provide a touch display device including: a display panel, with a touchscreen panel including a plurality of touch electrodes being embedded therein; a gate driving circuit supplying a gate signal to a plurality of gate lines; a data driving circuit supplying a data signal to a plurality of data lines; a touch driving circuit supplying a touch driving signal to the display panel and performing touch sensing in accordance with a signal received in response to the touch driving signal; and a touch power integrated circuit including a common voltage output circuit generating a touch driving signal to be applied to the touch electrodes and an alternating signal to be applied to the data lines during a touch sensing period in which the touch sensing is performed and a gate low voltage output circuit generating an alternating signal to be applied to the gate lines during the touch sensing period. The common voltage output circuit may include: a low-level common voltage generation circuit generating a low-level common voltage; a high-level common voltage generation circuit generating a high-level common voltage; and a multiplexer outputting the high-level common voltage and the low-level common voltage as an alternating signal. The low-level common voltage generation circuit may generate the low-level common voltage by receiving the high-level common voltage or the high-level common voltage generation circuit may generate the high-level common voltage by receiving the low-level common voltage.

According to another aspect, embodiments may provide a driving circuit of a touch display device including a display panel, with a touchscreen panel including a plurality of touch electrodes being embedded therein, a gate driving circuit supplying a gate signal to a plurality of gate lines, a data driving circuit supplying a data signal to a plurality of data lines, and a touch driving circuit supplying a touch driving signal to the display panel and performing touch sensing in accordance with a signal received in response to the touch driving signal. The driving circuit may include a touch power integrated circuit including a common voltage output circuit generating a touch driving signal to be applied to the touch electrodes and an alternating signal to be applied to the data lines during a touch sensing period in which the touch sensing is performed and a gate low voltage output circuit generating an alternating signal to be applied to the gate lines during the touch sensing period. The common voltage output circuit may include: a low-level common voltage generation circuit generating a low-level common voltage; a high-level common voltage generation circuit generating a high-level common voltage; and a multiplexer outputting the high-level common voltage and the low-level common voltage as an alternating signal. The low-level common voltage generation circuit may generate the low-level common voltage by receiving the high-level common voltage or the high-level common voltage generation circuit may generate the high-level common voltage by receiving the low-level common voltage.

According to another aspect, embodiments may provide a method of driving a touch display device including a display panel, with a touchscreen panel including a plurality of touch electrodes being embedded therein, a gate driving circuit supplying a gate signal to a plurality of gate lines, a data driving circuit supplying a data signal to a plurality of data lines, and a touch driving circuit supplying a touch driving signal to the display panel and performing touch sensing in accordance with a signal received in response to the touch driving signal. The method may include: generating a touch driving signal to be applied to the touch electrodes and a common voltage to be applied to the data lines during a touch sensing period in which the touch sensing is performed; and generating a gate low voltage to be applied to the gate lines during the touch sensing period in which the touch sensing is performed. A low-level common voltage may be generated by receiving a high-level common voltage, or the high-level common voltage may be generated by receiving the low-level common voltage.

According to another aspect, embodiments may provide a touch display device including: a display panel, with a touchscreen panel including a plurality of touch electrodes being embedded therein; a gate driving circuit supplying a gate signal to a plurality of gate lines; a data driving circuit supplying a data signal to a plurality of data lines; a touch driving circuit supplying a touch driving signal to the display panel and performing touch sensing in accordance with a signal received in response to the touch driving signal; and a touch power integrated circuit including a common voltage output circuit generating a touch driving signal to be applied to the touch electrodes and an alternating signal to be applied to the data lines during a touch sensing period in which the touch sensing is performed and a gate low voltage output circuit generating an alternating signal to be applied to the gate lines during the touch sensing period. The gate low voltage output circuit may include: a low-level gate low voltage generation circuit generating a low-level gate low voltage; a high-level gate low voltage generation circuit generating a high-level gate low voltage; and a multiplexer outputting the high-level gate low voltage and the low-level gate low voltage as an alternating signal. The low-level gate low voltage generation circuit may generate the low-level gate low voltage by receiving the high-level gate low voltage or the high-level gate low voltage generation circuit may generate the high-level gate low voltage by receiving the low-level gate low voltage.

According to another aspect, embodiments may provide a driving circuit of a touch display device including a display panel, with a touchscreen panel including a plurality of touch electrodes being embedded therein, a gate driving circuit supplying a gate signal to a plurality of gate lines, a data driving circuit supplying a data signal to a plurality of data lines, and a touch driving circuit supplying a touch driving signal to the display panel and performing touch sensing in accordance with a signal received in response to the touch driving signal. The driving circuit may include: a touch power integrated circuit including a common voltage output circuit generating a touch driving signal to be applied to the touch electrodes and an alternating signal to be applied to the data lines during a touch sensing period in which the touch sensing is performed and a gate low voltage output circuit generating an alternating signal to be applied to the gate lines during the touch sensing period. The gate low voltage output circuit may include: a low-level gate low voltage generation circuit generating a low-level gate low voltage; a high-level gate low voltage generation circuit generating a high-level gate low voltage; and a multiplexer outputting the high-level gate low voltage and the low-level gate low voltage as an alternating signal. The low-level gate low voltage generation circuit may generate the low-level gate low voltage by receiving the high-level gate low voltage or the high-level gate low voltage generation circuit may generate the high-level gate low voltage by receiving the low-level gate low voltage.

According to another aspect, embodiments may provide a method of driving a touch display device including a display panel, with a touchscreen panel including a plurality of touch electrodes being embedded therein, a gate driving circuit supplying a gate signal to a plurality of gate lines, a data driving circuit supplying a data signal to a plurality of data lines, and a touch driving circuit supplying a touch driving signal to the display panel and performing touch sensing in accordance with a signal received in response to the touch driving signal. The method may include: generating a touch driving signal to be applied to the touch electrodes and a common voltage to be applied to the data lines during a touch sensing period in which the touch sensing is performed; and generating a gate low voltage to be applied to the gate lines during the touch sensing period in which the touch sensing is performed. A low-level gate low voltage may be generated by receiving a high-level gate low voltage, or the high-level gate low voltage may be generated by receiving the low-level gate low voltage.

According to another aspect, embodiments may provide a touch display device including: a display panel, with a touchscreen panel including a plurality of touch electrodes being embedded therein; a gate driving circuit supplying a gate signal to a plurality of gate lines; a data driving circuit supplying a data signal to a plurality of data lines; a touch driving circuit supplying a touch driving signal to the display panel and performing touch sensing in accordance with a signal received in response to the touch driving signal; and a touch power integrated circuit supplying a signal for the touch sensing to the touch driving circuit. The touch power integrated circuit may include: a common voltage output circuit generating a touch driving signal to be applied to the touch electrodes and an alternating signal to be applied to the data lines during a touch sensing period in which the touch sensing is performed; a gate low voltage output circuit generating an alternating signal to be applied to the gate lines during the touch sensing period; and a trimming circuit applying a deviation in a reference gate low voltage to the gate low voltage output circuit using a common voltage generated by the common voltage output circuit or applying the deviation in the reference common voltage to the common voltage output circuit using a gate low voltage generated by the gate low voltage output circuit.

According to another aspect, embodiments may provide a driving circuit of a touch display device including a display panel, with a touchscreen panel including a plurality of touch electrodes being embedded therein, a gate driving circuit supplying a gate signal to a plurality of gate lines, a data driving circuit supplying a data signal to a plurality of data lines, and a touch driving circuit supplying a touch driving signal to the display panel and performing touch sensing in accordance with a signal received in response to the touch driving signal. The driving circuit may include: a common voltage output circuit generating a touch driving signal to be applied to the touch electrodes and an alternating signal to be applied to the data lines during a touch sensing period; a gate low voltage output circuit generating an alternating signal to be applied to the gate lines during the touch sensing period; and a trimming circuit applying a deviation in a reference gate low voltage to the gate low voltage output circuit using a common voltage generated by the common voltage output circuit or applying the deviation in the reference common voltage to the common voltage output circuit using a gate low voltage generated by the gate low voltage output circuit.

According to another aspect, embodiments may provide a method of driving a touch display device including a display panel, with a touchscreen panel including a plurality of touch electrodes being embedded therein, a gate driving circuit supplying a gate signal to a plurality of gate lines, a data driving circuit supplying a data signal to a plurality of data lines, and a touch driving circuit supplying a touch driving signal to the display panel and performing touch sensing in accordance with a signal received in response to the touch driving signal. The method may include: generating a touch driving signal to be applied to the touch electrodes and a common voltage to be applied to the data lines during a touch sensing period in which the touch sensing is performed; and generating a gate low voltage to be applied to the gate lines during the touch sensing period in which the touch sensing is performed. The gate low voltage may be generated using a common voltage or the common voltage may be generated using the gate low voltage.

According to another aspect, embodiments may provide a method of driving a touch display device including a display panel, with a touchscreen panel including a plurality of touch electrodes being embedded therein, a gate driving circuit supplying a gate signal to a plurality of gate lines, a data driving circuit supplying a data signal to a plurality of data lines, and a touch driving circuit supplying a touch driving signal to the display panel and performing touch sensing in accordance with a signal received in response to the touch driving signal, the method including at least one of: generating a touch driving signal to be applied to the touch electrodes and a common voltage to be applied to the data lines during a touch sensing period in which the touch sensing is performed, wherein a low-level common voltage is generated by receiving a high-level common voltage, or a high-level common voltage is generated by receiving the low-level common voltage; and generating a gate low voltage to be applied to the gate lines during the touch sensing period in which the touch sensing is performed, wherein a low-level gate low voltage is generated by receiving a high-level gate low voltage, or a high-level gate low voltage is generated by receiving the low-level gate low voltage.

According to another aspect, embodiments may provide a method of driving a touch display device including a display panel, with a touchscreen panel including a plurality of touch electrodes being embedded therein, a gate driving circuit supplying a gate signal to a plurality of gate lines, a data driving circuit supplying a data signal to a plurality of data lines, and a touch driving circuit supplying a touch driving signal to the display panel and performing touch sensing in accordance with a signal received in response to the touch driving signal, the method including: generating a touch driving signal to be applied to the touch electrodes and a common voltage to be applied to the data lines during a touch sensing period in which the touch sensing is performed; and generating a gate low voltage to be applied to the gate lines during the touch sensing period in which the touch sensing is performed, wherein the gate low voltage is generated using a common voltage or the common voltage is generated using the gate low voltage. In this case, a low-level common voltage may be generated by receiving a high-level common voltage, or a high-level common voltage may be generated by receiving the low-level common voltage. Additionally or alternatively, a low-level gate low voltage may be generated by receiving a high-level gate low voltage, or a high-level gate low voltage may be generated by receiving the low-level gate low voltage.

According to exemplary embodiments, in the driving circuit, the touch display device, and the driving method thereof, the effect of an offset to a touch driving signal and a load-free driving signal during a load-free driving process may be diminished to reduce deviations in the amplitude between the touch driving signal and the load-free driving signal.

In addition, according to exemplary embodiments, in the driving circuit, the touch display device, and the driving method thereof, a circuit is configured such that a touch driving signal and a load-free driving signal may have a dependent relationship to reduce deviations in amplitude between the touch driving signal and the load-free driving signal.

In addition, according to exemplary embodiments, in the driving circuit, the touch display device, and the driving method thereof, deviations in amplitude between a touch driving signal and a load-free driving signal may be reduced by trimming of the touch driving signal and the load-free driving signal.

BRIEF DESCRIPTION OF THE DRAWINGS

The above and other objects, features, and advantages of the present disclosure will be more clearly understood from the following detailed description, taken in conjunction with the accompanying drawings, in which.

DETAILED DESCRIPTION

Figure 1:
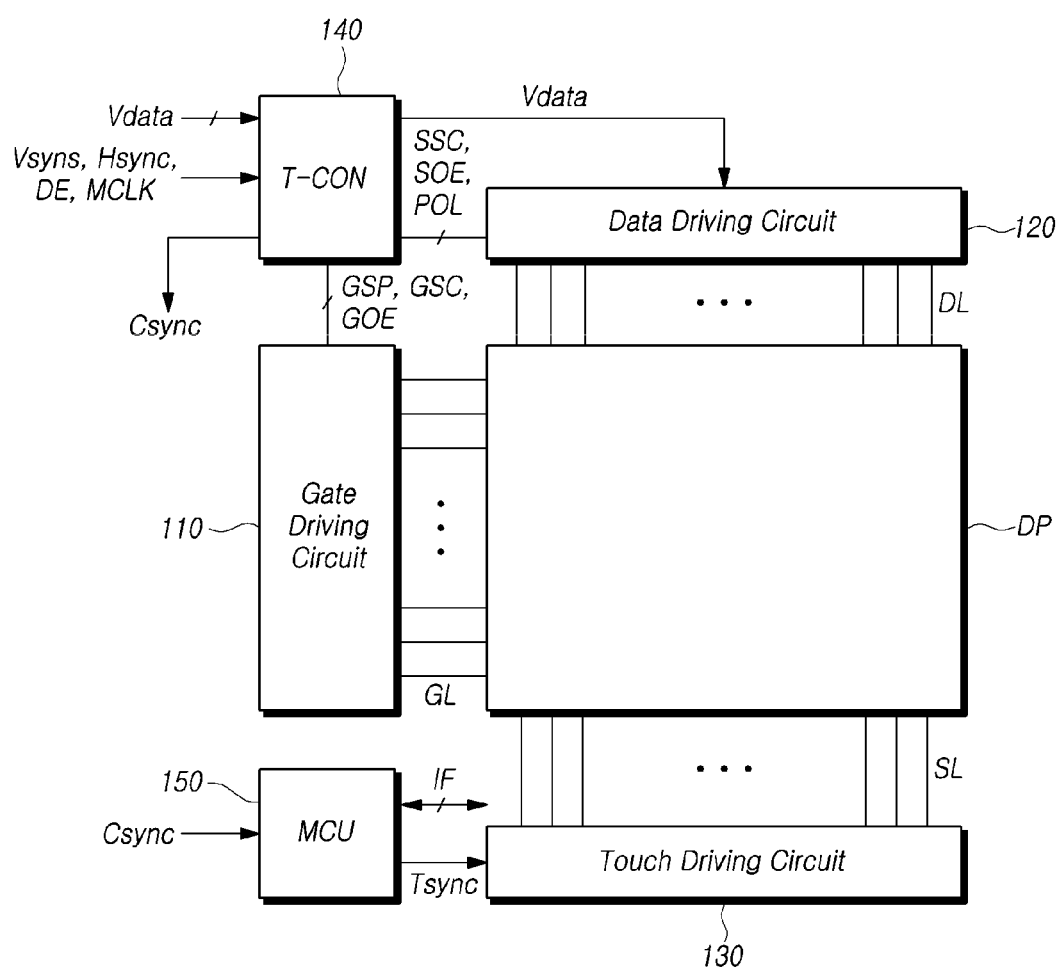
FIG. 1 is a block diagram illustrating a touch display device according to embodiments.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present disclosure. Each of these terms is not used to define essence, order, sequence, or number of elements etc., but is used merely to distinguish the corresponding element from other elements.

When it is mentioned that a first element "is connected or coupled to", "contacts or overlaps" etc., a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc., each other via a fourth element. Here, the second element may be included in at least one of two or more elements that "are connected or coupled to", "contact or overlap", etc., each other.

When time relative terms, such as "after", "subsequent to", "next", "before", and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc., are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

FIG. 1 is a block diagram illustrating a touch display device according to one or more embodiments of the present disclosure.

Referring to FIG. 1, the touch display device according to one or more embodiments may include a display panel DP, a gate driving circuit 110, a data driving circuit 120, a touch driving circuit 130, a timing controller (T-CON) 140, and a micro control unit (MCU) 150.

The display panel DP displays images on the basis of a scan signal SCAN transferred from the gate driving circuit 110 through gate lines GL and a data voltage Vdata transferred from the data driving circuit 120 through data lines DL. The display panel DP includes a liquid crystal layer situated between two substrates, and may operate in any known mode, such as twisted nematic (TN) mode, vertical alignment (VA) mode, in-plane switching (IPS) mode, or fringe field switching (FFS) mode.

A plurality of subpixels SP of the display panel DP may be defined by a plurality of data lines DL and a plurality of gate lines GL. A single subpixel SP may include a thin-film transistor (TFT) provided in an area in which a single data line DL intersects a single gate line GL, a pixel electrode, such as an organic light-emitting diode OLED, to be charged with the data voltage Vdata, a storage capacitor Cst electrically connected to the organic light-emitting diode OLED to maintain the voltage, and the like.

A black matrix, a color filter, and the like, may be provided on the upper substrate of the display panel DP, while thin-film transistors, subpixels SPs, common electrodes CEs, and the like, may be provided on the lower substrate of the display panel DP. The display panel DP may be provided using a color-filter-on-TFT (COT) structure. In this case, the black matrix and the color filter may be provided on the lower substrate of the display panel DP.

The common electrodes, to which a common voltage Vcom is supplied, may be provided on the upper substrate or the lower substrate of the display panel DP. Polarizers are attached to the upper substrate and the lower substrate of the display panel DP, and alignment films for setting the tilt angles of liquid crystal molecules are provided on inner surfaces of the upper and lower substrates in contact with the liquid crystal layer.

Column spacers for maintaining the cell gap of liquid crystal cells are provided between the upper substrate and the lower substrate of the display panel DP. A backlight unit is disposed below the bottom surface of the lower polarizer of the display panel DP. The backlight unit may be implemented as an edge-type backlight unit or a direct-type backlight unit to illuminate the display panel DP.

Here, a touchscreen panel having an incell touch structure may be embedded in a pixel array region of the display panel DP. The incell touchscreen panel uses electrodes in the shape of blocks (or points), for example, provided inside the display panel DP, as touch electrodes.

The timing controller 140 controls the gate driving circuit 110 and the data driving circuit 120. The timing controller 140 receives timing signals, such as a vertical synchronization signal Vsync, a horizontal synchronization signal Hsync, a data enable signal DE, and a main clock signal MCLK, as well as the data voltage Vdata of an image signal, from a host system (not shown).

The timing controller 140 controls the gate driving circuit 110, on the basis of scan timing control signals, such as a gate start pulse signal GSP, a gate shift clock signal GSC, an a gate output enable signal GOE. In addition, the timing controller 140 controls the data driving circuit 120, on the basis of data timing control signals, such as a source sampling clock signal SSC, a polarity control signal POL, and a source output enable signal SOE.

The gate driving circuit 110 sequentially drives the plurality of gate lines GL by sequentially supplying the scan signal SCAN to the display panel DP through the plurality of gate lines GL. Herein, the gate driving circuit 110 may also be referred to as a scan driving circuit or a gate driver IC (GDIC).

The gate driving circuit 110 may include one or more gate driver ICs (GDICs), and may be located on or adjacent to one or both sides of the display panel DP depending on the driving method. Alternatively, the gate driving circuit 110 may be implemented using a gate-in-panel structure in which the gate driving circuit 110 is embedded in a bezel area of the display panel DP.

The gate driving circuit 110 sequentially supplies the scan signal SCAN having an on or off voltage to the plurality of gate lines GL, under the control of the timing controller 140. In this regard, the gate driving circuit 110 may include a shift register, a level shifter, and the like.

The data driving circuit 120 drives the plurality of data lines DL by supplying the data voltage Vdata, received from the timing controller 140, to the plurality of data lines DL. Herein, the data driving circuit 120 may also be referred to as a source driving circuit or a source driver IC (SDIC).

The data driving circuit 120 may include one or more source driver ICs (SDICs). The source driver ICs (SDICs) may be connected to bonding pads of the display panel DP by a tape-automated bonding (TAB) method or a chip-on-glass (COG) method, may be directly mounted on the display panel DP, or in some cases, may be provided as integrated portions of the display panel DP. In addition, the source driver ICs (SDICs) may be implemented using a chip-on-film (COF) structure. In this case, the source driver ICs may be mounted on a circuit film and be electrically connected to the data lines DL of the display panel DP via the circuit film.

When a specific gate line GL is turned on by the gate driving circuit 110, the data driving circuit 120 converts the data voltage Vdata, received from the timing controller 140, into an analog image data voltage, and supplies the analog image data voltage to the plurality of data lines DL.

The data driving circuit 120 may be located on the upper or lower portion of (or above or below) the display panel DP, or may be located on both the upper and lower portions of (or above and below) the display panel DP, depending on the driving method, the design, or the like.

The data driving circuit 120 may include a shift register, a latch circuit, a digital-to-analog converter (DAC), an output buffer, and the like. The digital-to-analog converter is a component for converting the data voltage Vdata, received from the timing controller 140, into an analog image data voltage to be supplied to the data lines DL.

The touch driving circuit 130 detects a touch on the display panel DP and determines a touch location on the display panel DP. The touch driving circuit 130 may include a driving circuit generating a driving voltage to drive the touch electrodes and a sensing circuit generating data to detect touch presence and touch coordinates, on the basis of which the touch electrodes are sensed. The driving circuit and the sensing circuit of the touch driving circuit 130 may be implemented as a single IC referred to as a read-out IC (ROIC) or be provided as separate circuits divided depending on the function.

In addition, the source driver ICs of the data driving circuit 120 and the read-out IC (ROIC) of the touch driving circuit 130 may be combined together into an Source Read-out IC (SRIC).

The touch driving circuit 130 may be provided on an outer substrate connected to the display panel DP. The touch driving circuit 130 is connected to the display panel DP via a plurality of sensing lines SL. The touch driving circuit 130 may detect the presence of the touch and determine the touch position, on the basis of a difference in capacitance among the touch electrodes in the display panel DP. That is, a difference in capacitance occurs between a position located by a finger of a user and a position not located by the finger, and the touch driving circuit 130 determines the presence and position of the touch by detecting the difference in capacitance. The touch driving circuit 130 generates a touch sensing voltage regarding the present and location of the touch and transfers the touch sensing voltage to the micro control unit 150.

The micro control unit 150 controls the touch driving circuit 130. The micro control unit 150 may receive a control synchronization signal Csync from the timing controller 140 and generate a touch synchronization signal Tsync, on the basis of the control synchronization signal, to control the touch driving circuit 130. The micro control unit 150 transmits and receives a touch sensing signal or the like to and from the touch driving circuit 130, on the basis of an interface IF defined therebetween.

Here, the micro control unit 150 may be combined with the touch driving circuit 130 into a touch control circuit comprised of a single IC or may be combined with the timing controller 140 into a control circuit comprised of a single IC.

In addition, the touch display device may further include a memory (MEM). The memory may temporarily store the data voltage Vdata output from the timing controller 140 and may output the data voltage Vdata to the data driving circuit 120 in predetermined time. The memory MEM may be disposed inside or outside the data driving circuit 120. In a case in which the memory MEM is disposed outside the data driving circuit 120, the memory MEM may be disposed between the timing controller 140 and the data driving circuit 120. In addition, the memory MEM may include a buffer memory to store the data voltage Vdata received from an external source and supply the stored data voltage Vdata to the timing controller 140.

In addition, the touch display device may further include an interface enabling signal input and output to and from, or communications with, other external electronic devices or electronic components. For example, the interface may include at least one of a low-voltage differential signaling (LVDS) interface, a mobile industry processor interface (MIPI), or serial interface.

Figure 2:
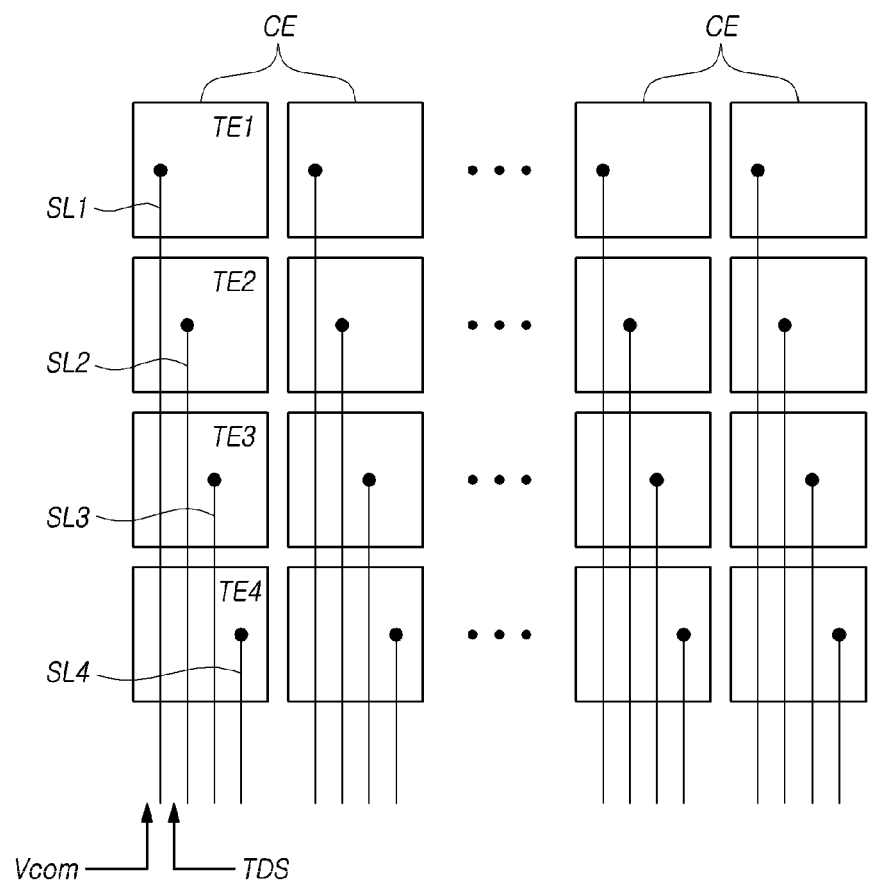
FIG. 2 is a block diagram illustrating the touchscreen panel provided in the display panel of the touch display device according to an embodiment.

FIG. 2 is a block diagram illustrating the touchscreen panel provided in the display panel of the touch display device according to one or more embodiments of the present disclosure.

Referring to FIG. 2, the touchscreen panel may be configured to be embedded in a pixel array area of the display panel DP, on the basis of an incell touch structure. Here, the touchscreen panel having the incell touch structure may use common electrodes CE, provided inside the display panel DP in the shape of blocks or points, as touch electrodes TE.

In the touchscreen panel TP having the incell touch structure, a common electrode CE, included in some of the plurality of subpixels SP provided within the display panel DP, forms a single touch electrode TE. The touch electrodes TE may be defined by the divided common electrodes CE in the display panel DP.

The plurality of touch electrodes TE may be arrayed in rows and columns in an active area of the display panel DP. Sensing lines SL, through which a touch sensing signal TSS is received, may be connected to the touch electrodes TE, respectively.

The touch electrodes TE may be capacitance sensors detecting a touch input on the basis of capacitance. The capacitance may be divided into mutual capacitance and self-capacitance. The self-capacitance may be formed along a single-layer conductive line extending in a single direction, while the mutual capacitance may be formed between two conductive lines perpendicularly intersecting each other.

The touch electrodes TE supply a common voltage Vcom to subpixels during a display period and detect a touch input by receiving a touch driving signal TDS during a touch sensing period.

Figure 3:
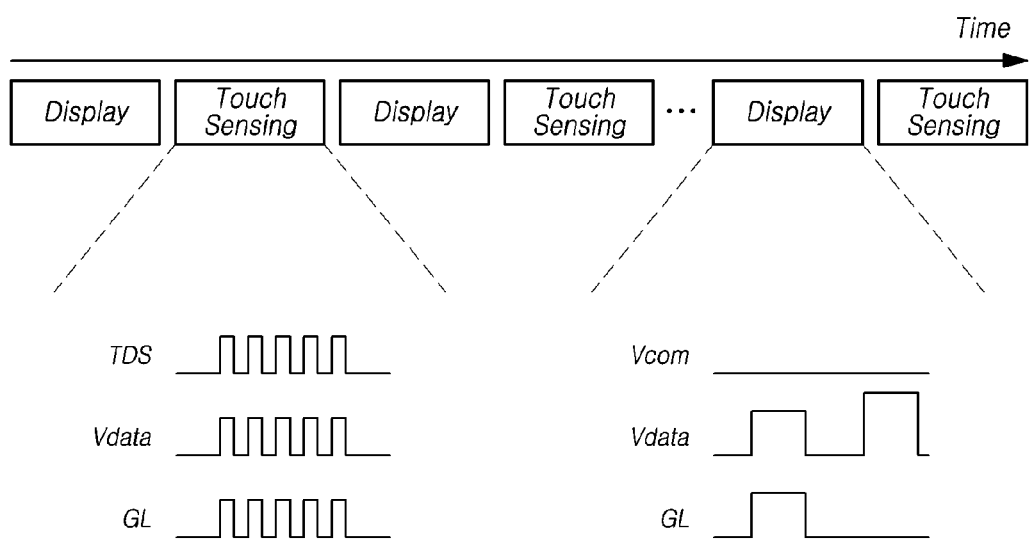
FIG. 3 is a signal timing diagram in a case in which the touch display device according to an embodiment operates by dividing a time into a display period and a touch period by time division.

FIG. 3 is a signal timing diagram in a case in which the touch display device according to one or more embodiments operates by dividing a time into a display period and a touch period by time division.

Referring to FIG. 3, the touch display device according to one or more embodiments may perform touch sensing by driving the touch electrodes of the touchscreen panel in blank periods between display periods.

For example, the touch display device may perform the touch sensing during vertical blank periods respectively in a single image frame or during some horizontal periods among a plurality of horizontal periods in a single image frame.

In a case in which the common electrodes CE of the touchscreen panel are used as the touch electrodes, the common voltage Vcom may be applied to the touch electrodes TE through the sensing lines SL connected to the touch electrodes in the display periods, and the touch driving signal TDS may be applied to the touch electrodes TE through the sensing lines SL connected to the touch electrodes TE in the touch sensing periods. The touch driving signal TDS may be a pulse signal, the voltage magnitude of which changes over time.

Since the display driving process is not performed during the touch sensing period, the electrodes or signal lines for the display driving may have no voltages applied thereto or may be in a constant-voltage state. Accordingly, parasitic capacitance may be generated among the touch electrodes TE to which the touch driving signal TDS is applied, the gate lines GL, the data lines DL, and the like, and the performance of the touch sensing signal may be degraded by the parasitic capacitance.

To prevent the parasitic capacitance generated among the touch electrodes TE, the gate lines GL, the data lines DL, and the like, a signal corresponding to the touch driving signal TDS applied to the touch electrodes TE may be supplied to the gate lines GL, the data lines DL, and the like during the touch sensing period.

For example, during the touch sensing period in which the touch sensing is performed, the data voltage Vdata with amplitude and phase of which are the same as those of the touch driving signal TDS may be supplied to the data lines DL. Here, since the gate lines GL are in a state in which a gate low voltage VGL has been applied thereto, an alternating signal with the amplitude and phase of which are the same as those of the touch driving signal TDS may be supplied to a line, to which the gate low voltage VGL is applied, during the touch sensing period, so that a signal, the amplitude and phase of which are the same as those of the touch driving signal TDS, may be supplied to the gate lines GL.

As described above, due to the supply of the alternating signal with the amplitude and phase of which are the same as those of the touch driving signal TDS to the gate lines GL, the data lines DL, and the like, parasitic capacitance between the touch electrodes TE and the sensing lines SL may be prevented, thereby improving the ability to detect the touch sensing signal.

In addition, during the display period in which the display driving is performed, the data voltage Vdata having a specific level may be applied to corresponding subpixels.

Figure 4:
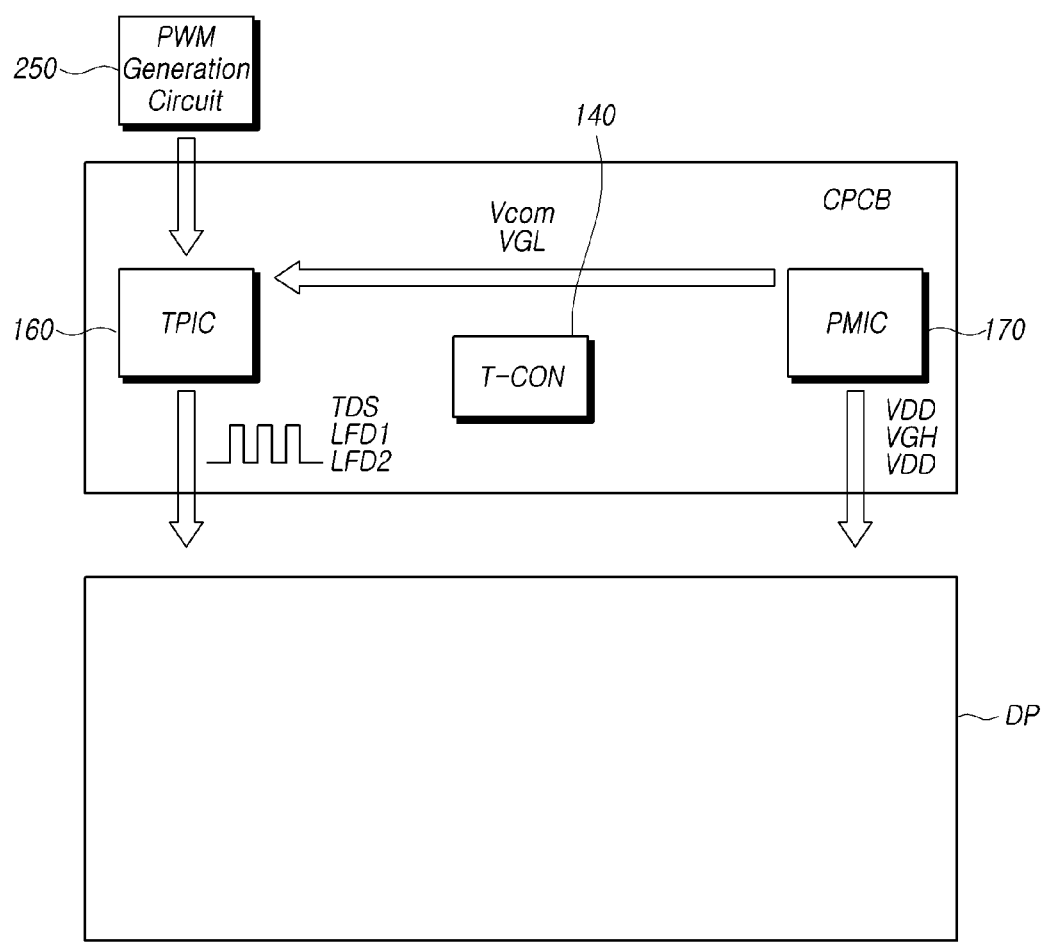
FIG. 4 is a block diagram illustrating a configuration of applying a driving signal and power to the display panel in the touch display device according to an embodiment.

FIG. 4 is a block diagram illustrating a configuration of applying a driving signal and power to the display panel in the touch display device according to one or more embodiments of the present disclosure.

Referring to FIG. 4, in the touch display device according to one or more embodiments, the timing controller 140, a touch power IC (TPIC) 160, and a power management IC (PMIC) 170 may be mounted on a control printed circuit board CPCB. In addition, the touch display device may include a pulse width modulation (PWM) generation circuit 250. The PWM generation circuit 250 may also be mounted on the control printed circuit board.

The control printed circuit board may be electrically connected to a source printed circuit board (SPCB) via a cable. The source printed circuit board and the display panel DP may be electrically connected using, for example, a COF structure. In a case in which the display panel DP is small-sized, the control printed circuit board and the source printed circuit board may be combined into a single structure.

Figure 5:
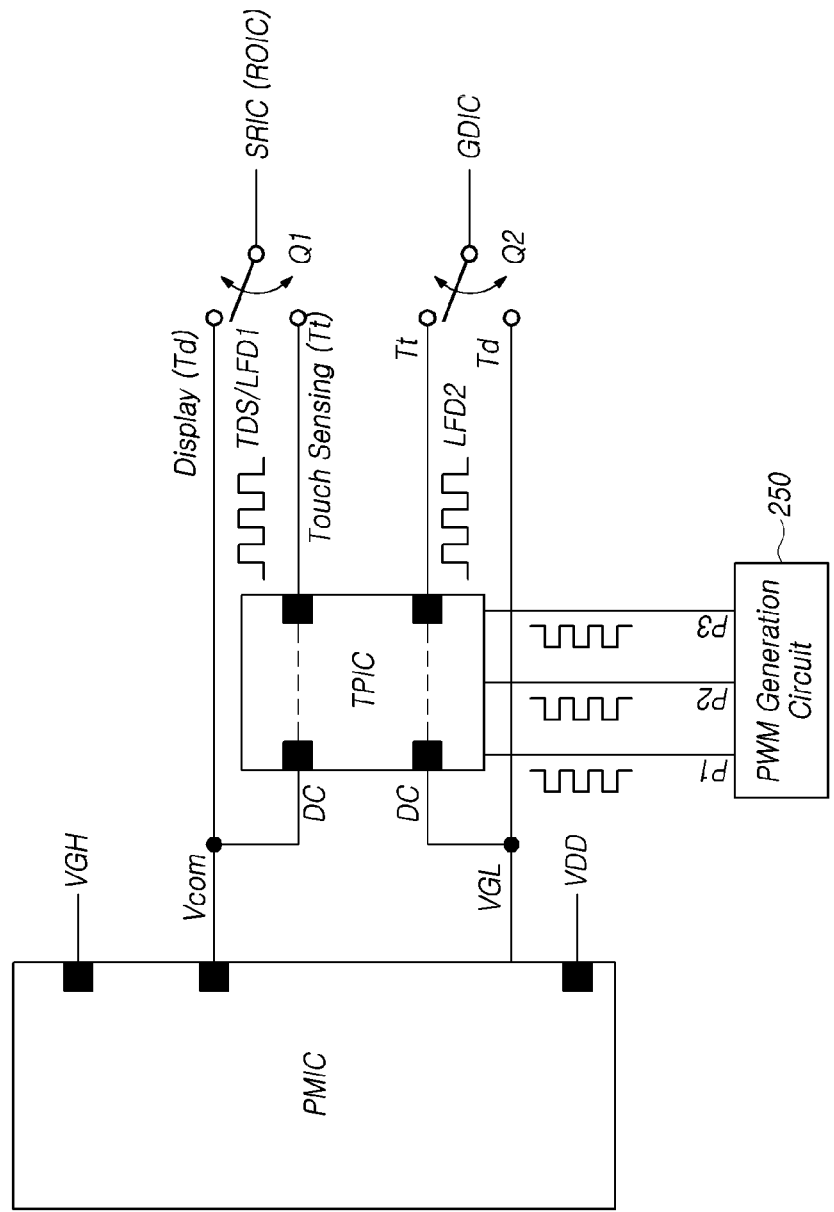
FIG. 5 is a block diagram illustrating a process of generating a load-free driving signal for load-free driving in the touch display device according to an embodiment.

FIG. 5 is a block diagram illustrating a process of generating a load-free driving signal for load-free driving in the touch display device according to one or more embodiments of the present disclosure.

Referring to FIG. 5, in the touch display device, the touch driving circuit 130, the read-out IC (ROIC), or the source read-out IC (SRIC) supplies, during a touch sensing period Tt, a touch driving signal TDS, input from the touch power IC 160, to selected touch electrodes TE, and outputs a touch sensing voltage by accumulating capacitance received from the touch electrodes TE.

In contrast, during a display period Td, a connection to sensing lines SL is disconnected, and a common voltage Vcom is applied to the touch electrodes TE.

That is, the touch driving circuit 130, the read-out IC (ROIC), or the source read-out IC (SRIC) causes the touch power IC 160 outputting a first load-free driving signal LFD1 to be connected to data lines DL during the touch sensing period Tt, so that the first load-free driving signal LFD1 is supplied to data lines DL.

In addition, the gate driving circuit 110 or a gate driver IC (GDIC) causes the touch power IC 160 generating a second load-free driving signal LFD2 to be connected to the gate lines GL during the touch sensing period Tt, so that the second load-free driving signal LFD2 is supplied to the gate lines GL.

In contrast, the gate driving circuit 110 or the GDIC is electrically disconnected from the touch power IC 160 during the display period Td.

The PWM generation circuit 250 may output a first PWM signal P1, a second PWM signal P2, and a third PWM signal P3 having the same phase.

The touch power IC 160 may generate the touch driving signal TDS, the amplitude of which is between a low-level common voltage Vcom_L and a high-level common voltage Vcom_H, on the basis of the first PWM signal P1, generate the first load-free driving signal LFD1, the amplitude of which is the same as that of the touch driving signal TDS, on the basis of the second PWM signal P2, and generate the second load-free driving signal LFD2, the amplitude of which is the same as that of the first load-free driving signal LFD1, on the basis of the third PWM signal P3.

The touch power IC 160 receives the gate low voltage VGL and the common voltage Vcom having a direct current (DC) level from the power management IC 170. The gate low voltage VGL is a voltage by which the thin-film transistors of the display panel DL may be turned off.

The touch power IC 160 generates the touch driving signal TDS by level-shifting the first PWM signal P1 input from the PWM generation circuit 250, on the basis of the common voltage Vcom. In addition, the touch power IC 160 generates the first load-free driving signal LFD1 by level-shifting the second PWM signal P2 input from the PWM generation circuit 250, on the basis of the common voltage Vcom. In addition, the touch power IC 160 generates the second load-free driving signal LFD2 by level-shifting the third PWM signal P3 input from the PWM generation circuit 250, on the basis of the gate low voltage VGL.

The touch power IC 160 controls the amplitudes of the touch driving signal TDS, the first load-free driving signal LFD1, and the second load-free driving signal LFD2 to be the same, so as to correspond to the gate low voltage VGL and the gate high voltage VGH.

Here, the touch power IC 160 may generate each of the touch driving signal TDS, the first load-free driving signal LFD1, and the second load-free driving signal LFD2 by level-shifting one of the first to third PWM signals P1 to P3 input from the PWM generation circuit 250.

In addition, the power management IC 170 may generate the gate high voltage VGH, the gate low voltage VGL, the common voltage Vcom, a driving voltage VDD, a logic voltage VCC, and the like.

The power management IC 170 generates the gate high voltage VGH during the display period Td in which the data voltage Vdata is applied to the subpixels. The gate high voltage VGH is a voltage by which the thin-film transistors of the display panel DP may be turned on during the display period Td.

Figure 6:
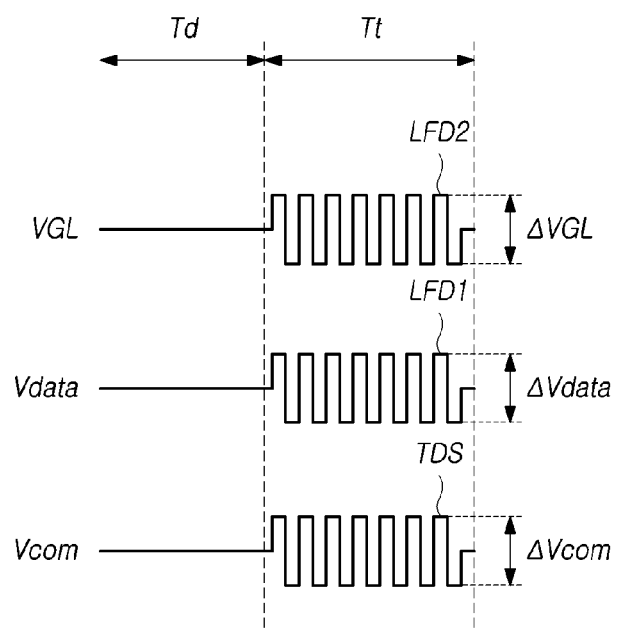
FIG. 6 is a diagram illustrating waveforms of a gate low voltage, a data voltage, and a common voltage in the load-free driving performed by the touch display device according to an embodiment.

FIG. 6 is a diagram illustrating waveforms of a gate low voltage, a data voltage, and a common voltage in the load-free driving performed by the touch display device according to one or more embodiments of the present disclosure.

Referring to FIG. 6, the gate driving circuit 110 or the GDIC operate within a predetermined range of driving voltage. The voltage level of the gate driving circuit 110 or the gate driver IC (GDIC) may be limited so that operating may be performed within the predetermined range of driving voltage. Here, the voltage level of the gate driving circuit 110 or the gate driver IC (GDIC) may be determined to be a voltage difference between the gate high voltage VGH and the gate low voltage VGL.

During the display period Td, the gate driving circuit 110 may supply the gate high voltage VGH or the gate low voltage VGL having a constant level to the gate lines GL, so that the display driving processing may be performed stably. In contrast, during the touch sensing period Tt, the gate driving circuit 110 may generate the second load-free driving signal LFD2 with the phase and amplitude of which are the same as those of the touch driving signal TDS and supply the second load-free driving signal LFD2 to the gate lines GL, thereby minimizing (or reducing) the effect of parasitic capacitance.

In addition, during the display period Td, the data driving circuit 120 supplies the data voltage Vdata, provided from the timing controller 140, to corresponding subpixels through the data lines DL, so that a designated color is displayed on the screen. In contrast, during the touch sensing period Tt, the data driving circuit 120 generates the first load-free driving signal LFD1 with the phase and amplitude of which are the same as those of the touch driving signal TDS, and supplies the first load-free driving signal LFD1 to the data lines DL, thereby minimizing (or reducing) the effect of parasitic capacitance.

The touch driving signal TDS and the load-free driving signals LFD1 and LFD2 supplied during the touch sensing period Tt correspond to alternating signals having a constant amplitude. Due to offsets present in amplifiers generating the touch driving signal TDS and the load-free driving signals LFD1 and LFD2, deviations in amplitude may be caused.

Figure 7:
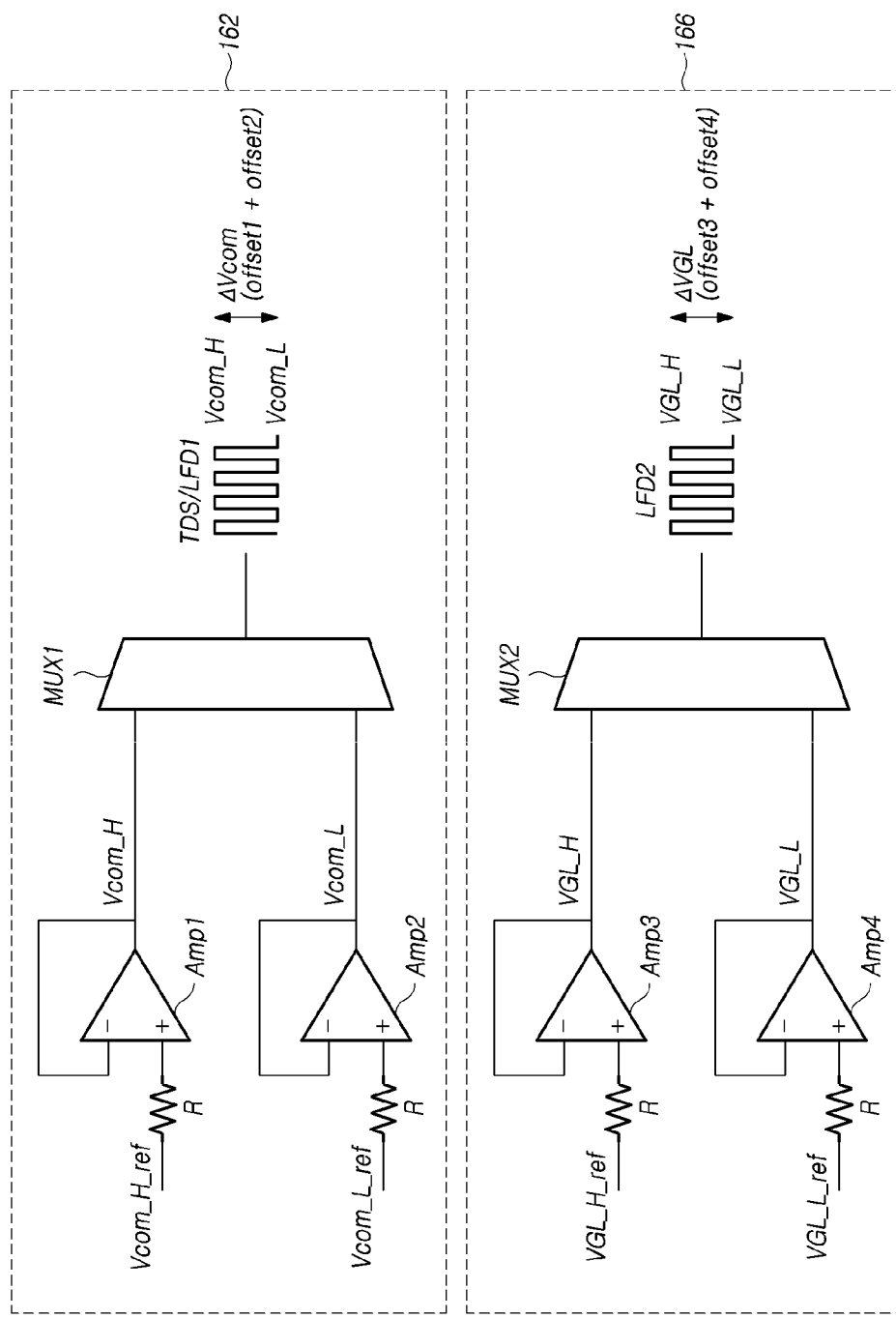
FIG. 7 is a diagram illustrating a configuration of the touch power IC generating a load-free driving signal in the touch display device.

FIG. 7 is a diagram illustrating a configuration of the touch power IC generating a load-free driving signal in the touch display device according to one more embodiments of the present disclosure.

Referring to FIG. 7, the touch power IC 160 may include a common voltage output circuit 162 and a gate low voltage output circuit 166. The common voltage output circuit 162 supplies the first load-free driving signal LFD1 through the data lines DL while supplying the touch driving signal TDS to the common electrodes CE during the touch sensing period Tt. The gate low voltage output circuit 166 supplies the second load-free driving signal LFD2 through the gate lines GL.

The common voltage output circuit 162 may include a first amplifier Amp1 generating the high-level common voltage Vcom_H, a second amplifier Amp2 generating the low-level common voltage Vcom_L, and a first multiplexer MUX1 sequentially outputting output signals of the first amplifier Amp1 and the second amplifier Amp2.

The first amplifier Amp1 receives a high-level reference common voltage Vcom_H_ref from a non-inverting input node (+) thereof, and an output node thereof (or an output signal) is fed back to an inverting input node (−) thereof. The high-level reference common voltage Vcom_H_ref is a reference voltage by which the high-level common voltage Vcom_H is generated.

The second amplifier Amp2 receives a low-level reference common voltage Vcom_L_ref from a non-inverting input node (+) thereof, and an output node thereof (or an output signal) is fed back to an inverting input node (−). The low-level reference common voltage Vcom_L_ref is a reference voltage by which the low-level common voltage Vcom_L is generated.

The first multiplexer MUX1 sequentially outputs the high-level common voltage Vcom_H of the first amplifier Amp1 and the low-level common voltage Vcom_L of the second amplifier Amp2, thereby outputting the touch driving signal TDS and the first load-free driving signal LFD1 having a common voltage deviation ΔVcom as an amplitude.

The gate low voltage output circuit 166 may include a third amplifier Amp3 generating a high-level gate low voltage VGL_H, a fourth amplifier Amp4 generating a low-level gate low voltage Vcom_L, and a second multiplexer MUX2 sequentially outputting output signals of the third amplifier Amp3 and the fourth amplifier Amp4.

The third amplifier Amp3 receives a high-level reference gate low voltage VGL_H_ref from a non-inverting input node (+) thereof, and an output node thereof (or an output signal) is fed back to the inverting input node (−) thereof. The high-level reference gate low voltage VGL_H_ref is a reference voltage by which the high-level gate low voltage VGL_H is generated.

The fourth amplifier Amp4 receives a low-level reference gate low voltage VGL_L_ref from a non-inverting input node (+) thereof, and an output node thereof (or an output signal) is fed back to an inverting input node (−) thereof. The low-level reference gate low voltage VGL_L_ref is a reference voltage generating a low-level gate low voltage VGL_L is generated.

The second multiplexer MUX2 sequentially outputs the high-level gate low voltage VGL_H of the third amplifier Amp3 and the low-level gate low voltage VGL_L of the fourth amplifier Amp4, thereby outputting the second load-free driving signal LFD2 having a gate low voltage deviation ΔVGL (i.e., a deviation in the gate low voltage) as an amplitude.

Here, the first amplifier Amp1 to the fourth amplifier Amp4 may have offsets thereof. Such offsets cause changes in the output signals of the amplifiers, thereby causing amplitude deviations in the common voltage Vcom and the gate low voltage VGL.

For example, in the common voltage output circuit 162 generating the common voltage Vcom, in a case in which the first amplifier Amp1 and the second amplifier Amp2 are independently connected to the first multiplexer MUX1, the effect of the first offset offset1 inherent to the first amplifier Amp1 is independent of the effect of the second offset offset2 inherent to the second amplifier Amp2. Thus, the deviation ΔVcom in the touch driving signal TDS and the first load-free driving signal LFD1, output through the first multiplexer MUX1, includes an offset (offset1+offset2) obtained by adding the first offset offset1 and the second offset offset2.

In addition, in the gate low voltage output circuit 166 generating the gate low voltage VGL, since the third amplifier Amp3 and the fourth amplifier Amp4 are independently connected to the second multiplexer MUX2, the deviation ΔVGL in the second load-free driving signal LFD2, output through the second multiplexer MUX2, includes an offset (offset3+offset4) obtained by adding a third offset offset3 of the third amplifier Amp3 and a fourth offset offset4 of the fourth amplifier Amp4.

As a result, the common voltage Vcom and the gate low voltage VGL output through the touch power IC indicate an offset (offset1+offset2+offset3+offset4) including all of the first offset offset1 of the first amplifier Amp1 to the fourth offset offset4 of the fourth amplifier Amp4.

Accordingly, a deviation in amplitude between the touch driving signal TDS and the load-free driving signals LFD1 and LFD2 is increased, thereby degrading touch recognition performance, which is problematic.

Figure 8:
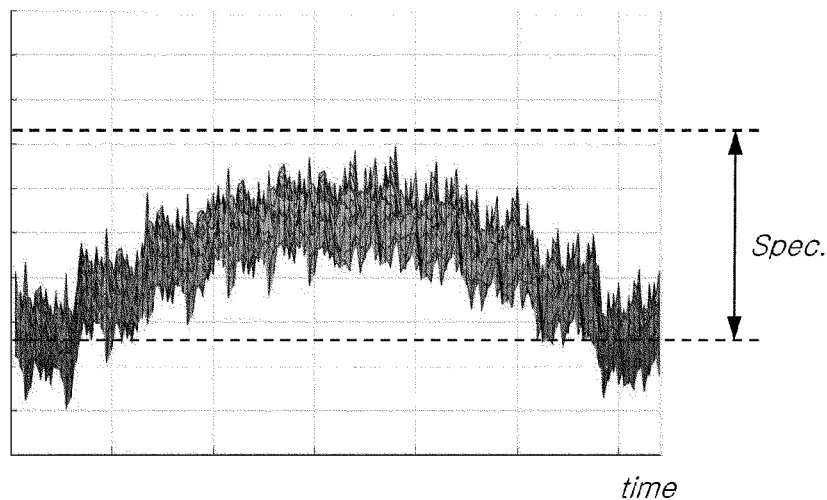
FIG. 8 is a graph illustrating an example of deviations in a common voltage and a gate low voltage generated by the touch power IC in the touch display device.

FIG. 8 is a graph illustrating an example of deviations in a common voltage and a gate low voltage generated by the touch power IC in the touch display device.

Referring to FIG. 8, a difference between a deviation ΔVcom in the common voltage and a deviation ΔVGL in the gate low voltage generated by the touch power IC may generally not be significant and indicate a relatively constant amplitude.

However, in a case in which the offsets offset1 to offset4 of the amplifiers Amp1 to Amp4 of the touch power IC overlap, the amplitude between the common voltage deviation ΔVcom and the gate low voltage deviation ΔVGL increases.

As a result, the common voltage deviation ΔVcom and the gate low voltage deviation ΔVGL may be out of reference ranges, thereby degrading touch sensing performance.

To solve this problem, the touch display device according to one or more embodiments of the present disclosure connects the amplifiers in the common voltage output circuit 162 and the gate low voltage output circuit 166 in the touch power IC to have a dependent relationship.

Figure 9:
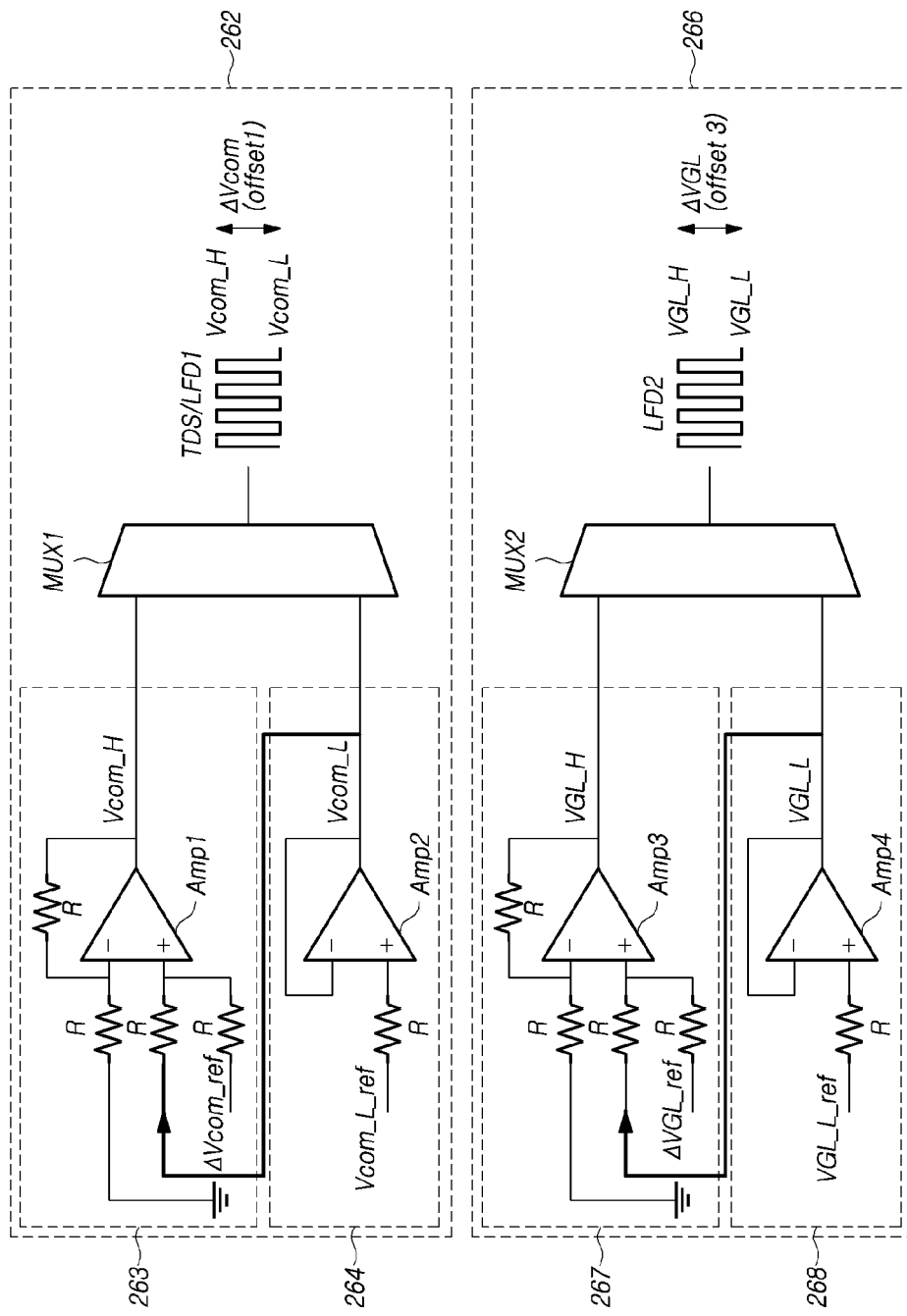
FIG. 9 is a diagram illustrating a configuration of the touch power IC generating a load-free driving signal in the touch display device according to an embodiment.

FIG. 9 is a diagram illustrating a configuration of the touch power IC generating a load-free driving signal in the touch display device according to one or more embodiments of the present disclosure.

Referring to FIG. 9, the touch power IC of the touch display device according to one or more embodiments may include a common voltage output circuit 262 and a gate low voltage output circuit 266. The common voltage output circuit 262 supplies the first load-free driving signal LFD1 through the data lines DL while supplying the touch driving signal TDS to the common electrodes CE during the touch sensing period Tt. The gate low voltage output circuit 266 supplies the second load-free driving signal LFD2 through the gate lines GL.

The common voltage output circuit 262 may include a high-level common voltage generation circuit 263 generating a high-level common voltage Vcom_H, a low-level common voltage generation circuit 264 generating a low-level common voltage Vcom_L, and a first multiplexer MUX1 sequentially outputting output signals of the high-level common voltage generation circuit 263 and the low-level common voltage generation circuit 264.

The high-level common voltage generation circuit 263 generates the high-level common voltage Vcom_H by receiving the low-level common voltage Vcom_L from the low-level common voltage generation circuit 264.

The inverting input node (−) of the first amplifier Amp1 of the high-level common voltage generation circuit 263 receives the high-level common voltage Vcom_H fed back thereto via a resistor R, and is grounded via another resistor R. In addition, the non-inverting input node (+) of the first amplifier Amp1 receives the low-level common voltage Vcom_L of the second amplifier Amp2 input thereto via a resistor R. At this time, a reference common voltage deviation ΔVcom ref corresponding to a difference between a high-level reference common voltage Vcom_H_ref and a low-level reference common voltage Vcom_L_ref is also applied to the non-inverting input node (+) of the first amplifier Amp1.

As a result, the high-level common voltage generation circuit 263 including the first amplifier Amp1 serves as an adder. That is, the high-level common voltage generation circuit 263 outputs the high-level common voltage Vcom_H by adding the low-level common voltage Vcom_L and the reference common voltage deviation ΔVcom ref input to the non-inverting input node (+).

In the second amplifier Amp2 of the low-level common voltage generation circuit 264, the low-level reference common voltage Vcom_L_ref is applied to the non-inverting input node (+), and the output node (or an output signal) is fed back to the input node (−). The low-level reference common voltage Vcom_L_ref is a reference voltage by which the low-level common voltage Vcom_L is generated. As a result, the second amplifier Amp2 serves as a buffer and outputs the low-level common voltage Vcom_L. The low-level common voltage Vcom_L is applied to the non-inverting input node (+) of the first amplifier Amp1 via the resistor R.

Accordingly, the first multiplexer MUX1 receives and sequentially outputs the high-level common voltage Vcom_H of the first amplifier Amp1 and the low-level common voltage Vcom_L of the second amplifier Amp2. Here, since the high-level common voltage Vcom_H applied to the first multiplexer MUX1 is generated using the low-level common voltage Vcom_L, the high-level common voltage Vcom_H is dependent on the low-level common voltage Vcom_L, and thus, the common voltage deviation ΔVcom output through the first multiplexer MUX1 only includes the offset offset1 of the first amplifier Amp1.

In this case, the high-level common voltage generation circuit 263 including the first amplifier Amp1 is provided as an adder (or adder circuit), since the first amplifier Amp1 generates the high-level common voltage Vcom_H using the low-level common voltage Vcom_L. The adder may have a variety of configurations comprised of different types and arrangements of circuit elements.

In contrast, the low-level common voltage Vcom_L may be dependent on the high-level common voltage Vcom_H by applying the high-level common voltage Vcom_H to the second amplifier Amp2. In this case, a voltage obtained by subtracting the reference common voltage deviation ΔVcom ref from the high-level common voltage Vcom_H must be applied to the second amplifier Amp2. Accordingly, the low-level common voltage generation circuit 264 including the second amplifier Amp2 may be provided as a subtractor circuit serving as a subtractor.

In a case in which the low-level common voltage generation circuit 264 is provided as a subtractor, an output signal may be fed back to the inverting input node (−) of the second amplifier Amp2, and at the same time, the low-level reference common voltage Vcom_L_ref may be applied to the inverting input node (−) of the second amplifier Amp2. In addition, an output signal of the first amplifier Amp1, as well as the reference common voltage deviation ΔVcom ref corresponding to a difference between the high-level reference common voltage Vcom_H_ref and the low-level reference common voltage Vcom_L_ref, may be applied to the non-inverting input node (+) of the second amplifier Amp2. In this case, the common voltage deviation ΔVcom output through the first multiplexer MUX1 only includes the offset offset2 of the second amplifier Amp2. The subtractor, as described above, may have a variety of configurations comprised of different types and arrangements of circuit elements.

The gate low voltage output circuit 266 may include a high-level gate low voltage generation circuit 267 generating a high-level gate low voltage VGL_H, a low-level gate low voltage generation circuit 268 generating a low-level gate low voltage VGL_L, and a second multiplexer MUX2 sequentially outputting output signals of the high-level gate low voltage generation circuit 267 and the low-level gate low voltage generation circuit 268.

The high-level gate low voltage generation circuit 267 generates the high-level gate low voltage VGL_H by receiving the low-level gate low voltage VGL_L from the low-level gate low voltage generation circuit 268.

The inverting input node (−) of the third amplifier Amp3 of the high-level gate low voltage generation circuit 267 receives the high-level gate low voltage VGL_H fed back thereto via a resistor R, and is grounded via another resistor R. In addition, the low-level gate low voltage VGL_L output from the fourth amplifier Amp4 is applied to the non-inverting input node (+) of the third amplifier Amp3 via a resistor R. Together with the low-level gate low voltage VGL_L, a reference gate low voltage deviation ΔVGL_ref (i.e., a deviation in the reference gate low voltage) corresponding to a difference between the high-level reference gate low voltage VGL_H_ref and the low-level reference gate low voltage VGL_L_ref is applied to the non-inverting input node (+) of the third amplifier Amp3.

As a result, the high-level gate low voltage generation circuit 267 including the third amplifier Amp3 serves as an adder. That is, the third amplifier Amp3 of the high-level gate low voltage generation circuit 267 outputs the high-level gate low voltage VGL_H by adding the low-level gate low voltage VGL_L and the reference gate low voltage deviation ΔVGL_ref applied to the non-inverting input node (+).

The fourth amplifier Amp4 receives the low-level reference gate low voltage VGL_L_ref applied to the non-inverting input node (+) thereof, and the output node thereof is fed back to the inverting input node (−). The low-level reference gate low voltage VGL_L_ref is a reference voltage by which the low-level gate low voltage VGL_L is generated. As a result, the fourth amplifier Amp4 serves as a buffer and outputs the low-level gate low voltage VGL_L. The low-level gate low voltage VGL_L is applied to the non-inverting input node (+) of the third amplifier Amp3 via the resistor R.

Accordingly, the second multiplexer MUX2 receives and sequentially outputs the high-level gate low voltage VGL_H output from the third amplifier Amp3 and the low-level gate low voltage VGL_L output from the fourth amplifier Amp4. Since the high-level gate low voltage VGL_H applied to the second multiplexer MUX2 is generated using the low-level gate low voltage VGL_L, the high-level gate low voltage VGL_H is dependent on the low-level gate low voltage VGL_L, and thus, the deviation ΔVGL in the gate low voltage output through the second multiplexer MUX2 only includes the offset offset3 of the third amplifier Amp3.

In this case, the high-level gate low voltage generation circuit 267 including the third amplifier Amp3 is provided as an adder (or adder circuit), since the third amplifier Amp3 generates the high-level gate low voltage VGL_H using the low-level gate low voltage VGL_L.

In contrast, the fourth amplifier Amp4 may generate the low-level gate low voltage VGL_L using the high-level gate low voltage VGL_H, so that the low-level gate low voltage VGL_L is dependent on the high-level gate low voltage VGL_H. In this case, the low-level gate low voltage generation circuit 268 may be provided as a subtractor circuit serving as a subtractor, since a voltage obtained by subtracting the reference gate low voltage deviation ΔVGL_ref from the high-level gate low voltage VGL_H must be applied to the fourth amplifier Amp4. In this case, the deviation ΔVGL in the gate low voltage output through the second multiplexer MUX2 only includes the offset offset4 of the fourth amplifier Amp4.

In a case in which the common voltage output circuit 262 is configured as described above, the high-level common voltage generation circuit 263 is dependent on the low-level common voltage generation circuit 264. Thus, only the offset offset1 of the first amplifier Amp1 of the high-level common voltage generation circuit 263 is included in the common voltage Vcom output through the first multiplexer MUX1, thereby providing an effect by which the common voltage deviation ΔVcom is reduced. Or, the low-level common voltage generation circuit 264 is dependent on the high-level common voltage generation circuit 263. Thus, only the offset offset2 of the second amplifier Amp2 of the low-level common voltage generation circuit 264 is included in the common voltage Vcom output through the first multiplexer MUX1, thereby providing an effect by which the common voltage deviation ΔVcom is reduced.

In addition, also in the case of the gate low voltage output circuit 266, the high-level gate low voltage generation circuit 267 is dependent on the low-level gate low voltage generation circuit 268. Thus, only the offset offset3 of the third amplifier Amp3 of the high-level gate low voltage generation circuit 267 is included in the gate low voltage VGL output through the second multiplexer MUX2, thereby providing an effect that the deviation ΔVGL of the gate low voltage is reduced. Or, the low-level gate low voltage generation circuit 268 is dependent on the high-level gate low voltage generation circuit 267. Thus, only the offset offset4 of the fourth amplifier Amp4 of the low-level gate low voltage generation circuit 268 is included in the gate low voltage VGL output through the second multiplexer MUX2, thereby providing an effect that the deviation ΔVGL of the gate low voltage is reduced.

Figure 10:
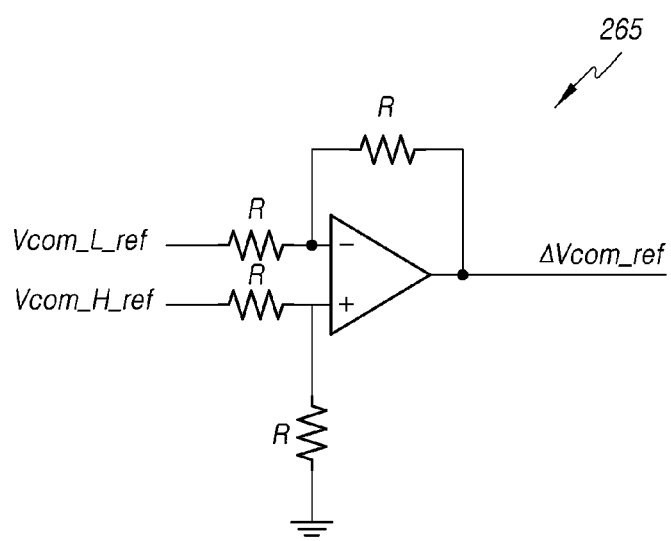
FIG. 10 illustrates an example circuit for outputting a reference common voltage deviation in the touch display device according to an embodiment.

FIG. 10 illustrates an example circuit for outputting a reference common voltage deviation in the touch display device according to one or more embodiments of the present disclosure.

Referring to FIG. 10, a circuit 265 outputting the reference common voltage deviation ΔVcom ref may be implemented as a subtractor receiving the high-level reference common voltage Vcom_H_ref and the low-level reference common voltage Vcom_L_ref and outputting a difference between the two voltages.

That is, the circuit 265 outputting the reference common voltage deviation ΔVcom ref receives the low-level reference common voltage Vcom_L_ref applied to the inverting input node (−) of the amplifier via a resistor R, and the output node is fed back to the inverting input node (−) via another resistor R. In addition, the high-level reference common voltage Vcom_H_ref is applied to the non-inverting input node (+) of the amplifier via a resistor R, and the non-inverting input node (+) is grounded via another resistor R.

The circuit 265 outputting the reference common voltage deviation ΔVcom ref, having the above described-configuration, generates the reference common voltage deviation ΔVcom ref as an output signal by subtracting the low-level reference common voltage Vcom_L_ref from the high-level reference common voltage Vcom_H_ref.

In addition, the deviation ΔVGL_ref in the reference gate low voltage applied to the gate low voltage output circuit 266 may be generated by the same circuit, in particular, by changing input signals to the high-level reference gate low voltage VGL_H_ref and the low-level reference gate low voltage VGL_L_ref.

As described hereinabove, the high-level common voltage generation circuit 263 and the low-level common voltage generation circuit 264 of the common voltage output circuit 262 are dependent on each other, and the high-level gate low voltage generation circuit 267 and the low-level gate low voltage generation circuit 268 of the gate low voltage output circuit 266 are dependent on each other, so that the offset of the common voltage output circuit 262 and the offset of the gate low voltage output circuit 266 are reduced.

Furthermore, the common voltage output circuit 262 and the gate low voltage output circuit 266 may be configured to be dependent on each other in order to further reduce the deviation ΔVcom in the common voltage and the deviation ΔVGL in the gate low voltage.

Figure 11:
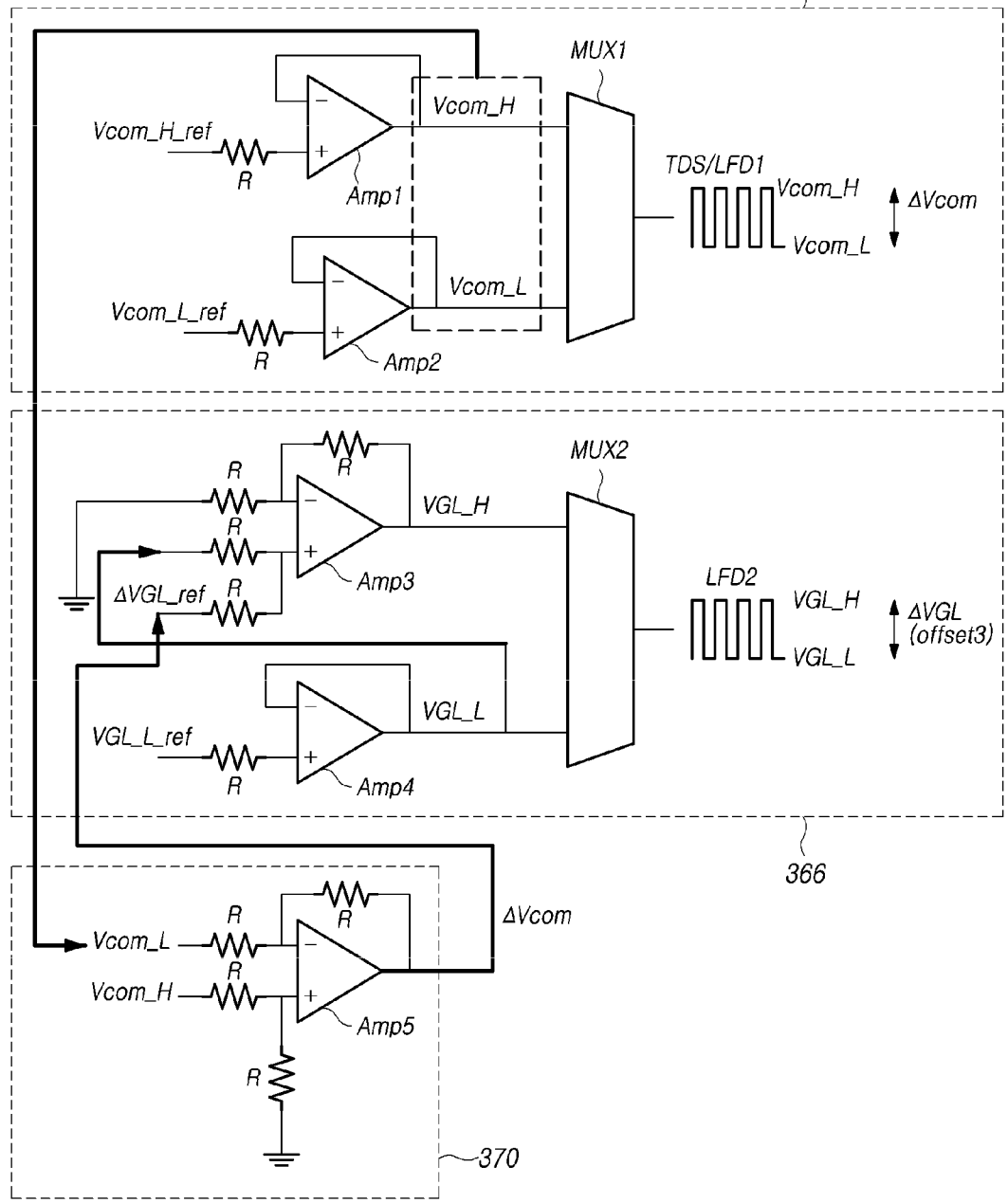
FIG. 11 is a circuit diagram illustrating a touch power IC configuration generating a load-free driving signal in a touch display device according to another embodiment.

FIG. 11 is a circuit diagram illustrating a touch power IC configuration generating a load-free driving signal in a touch display device according to one or more embodiments of the present disclosure.

Referring to FIG. 11, the touch power IC of the touch display device according to one of the more embodiments may include a common voltage output circuit 362, a gate low voltage output circuit 366, and a trimming circuit 370. The common voltage output circuit 362 supplying the first load-free driving signal LFD1 through data lines DL while supplying the touch driving signal TDS to common electrodes CE during the touch sensing period Tt. The gate low voltage output circuit 366 supplies a second load-free driving signal LFD2 through gate lines GL.

The trimming circuit 370 is a component applying the reference gate low voltage deviation ΔVGL_ref to the gate low voltage output circuit 366 using the common voltage Vcom generated by the common voltage output circuit 362 or applying the reference common voltage deviation ΔVcom ref to the common voltage output circuit 362 using the gate low voltage VGL generated by the gate low voltage output circuit 366.

Accordingly, the trimming circuit 370 may be configured to apply the reference gate low voltage deviation ΔVGL_ref to the gate low voltage output circuit 366 using the common voltage Vcom generated by the common voltage output circuit 362 or to apply the reference common voltage deviation ΔVcom ref to the common voltage output circuit 362 using the gate low voltage VGL generated by the gate low voltage output circuit 366.

For example, in the trimming circuit 370, the low-level common voltage Vcom_L generated by the common voltage output circuit 362 is applied to the inverting input node (−) of an amplifier Amp5 via a resistor R, and the output node is fed back to the inverting input node (−) via another resistor R. In addition, the high-level common voltage Vcom_H generated by the common voltage output circuit 362 is applied to the non-inverting input node (+) of the amplifier Amp5 via a resistor R, and the non-inverting input node (+) is grounded via another resistor R.

As described above, the trimming circuit 370 may cause the common voltage output circuit 362 and the gate low voltage output circuit 366 to be dependent on each other, thereby further reducing the common voltage deviation ΔVcom and the gate low voltage deviation ΔVGL.

Herein, by way of example, the trimming circuit 370 is configured to apply the reference gate low voltage deviation ΔVGL_ref to the gate low voltage output circuit 366 using the common voltage Vcom generated by the common voltage output circuit 362.

The common voltage output circuit 362 may be configured to generate the high-level common voltage Vcom_H and the low-level common voltage Vcom_L to be dependent on each other, as illustrated in FIG. 9, or may be configured to generate the high-level common voltage Vcom_H and the low-level common voltage Vcom_L to be independent of each other.

Herein, by way of example, the high-level common voltage Vcom_H and the low-level common voltage Vcom_L are illustrated as being independent of each other.

The common voltage output circuit 362 may include the first amplifier Amp1 generating the high-level common voltage Vcom_H, the second amplifier Amp2 generating the low-level common voltage Vcom_L, and the first multiplexer MUX1 sequentially outputting output signals of the first amplifier Amp1 and the second amplifier Amp2.

The first amplifier Amp1 receives the high-level reference common voltage Vcom_H_ref applied to the non-inverting input node (+) thereof, and the output node thereof is fed back to the inverting input node (−).

The second amplifier Amp1 receives the low-level reference common voltage Vcom_L_ref applied to the non-inverting input node (+) thereof, and the output node is fed back to the inverting input node (−).

The first multiplexer MUX1 sequentially outputs the high-level common voltage Vcom_H generated by the first amplifier Amp1 and the low-level common voltage Vcom_L generated by the second amplifier Amp2, thereby outputting the touch driving signal TDS and the first load-free driving signal LFD1 having the common voltage deviation ΔVcom as an amplitude.

The trimming circuit 370 generates the reference gate low voltage deviation ΔVGL_ref using the high-level common voltage Vcom_H and the low-level common voltage Vcom_L generated by the common voltage output circuit 362.

Here, the trimming circuit 370 may generate the common voltage deviation ΔVcom, corresponding to a difference between the high-level common voltage Vcom_H and the low-level common voltage Vcom_L generated by the common voltage output circuit 362, as an output signal.

Accordingly, it may be necessary to adjust the output signal of the trimming circuit 370 into the reference gate low voltage deviation ΔVGL_ref to be applied to the gate low voltage output circuit 366. This may be enabled by controlling the high-level reference common voltage Vcom_H_ref and the low-level reference common voltage Vcom_L_ref applied to the common voltage output circuit 362.

Alternatively, the gate low voltage deviation ΔVGL_ref corresponding to the common voltage deviation ΔVcom may be stored in a memory, and afterwards, in response to the output signal of the trimming circuit 370, the corresponding gate low voltage deviation ΔVGL_ref may be controlled to be supplied to the gate low voltage output circuit 366 from the memory.

For example, the gate low voltage deviation ΔVGL_ref corresponding to the common voltage deviation ΔVcom may be stored in a lookup table. The timing controller 140 or the touch power IC 160 may control the corresponding gate low voltage deviation ΔVGL_ref to be supplied to the gate low voltage output circuit 366 by reading the output signal of the trimming circuit 370.

The gate low voltage output circuit 366 may include a high-level gate low voltage generation circuit generating the high-level gate low voltage VGL_H, a low-level gate low voltage generation circuit generating the low-level gate low voltage VGL_L, and the second multiplexer MUX2 sequentially outputting output signals of the high-level gate low voltage generation circuit and the low-level gate low voltage generation circuit.

The inverting input node (−) of the third amplifier Amp3 of the high-level gate low voltage generation circuit receives the high-level gate low voltage VGL_H fed back thereto via a resistor R, and is grounded via another resistor R. In addition, the low-level gate low voltage VGL_L output from the fourth amplifier Amp4 is applied to the non-inverting input node (+) of the third amplifier Amp3 via a resistor R. Together with the low-level gate low voltage VGL_L, the reference gate low voltage deviation ΔVGL_ref, corresponding to a difference between the high-level reference gate low voltage VGL_H_ref and the low-level reference gate low voltage VGL_L_ref, is applied to the non-inverting input node (+) of the third amplifier Amp3.

As a result, the portion including the third amplifier Amp3 provides an adder circuit serving as the adder. That is, the adder (or adder circuit) including the third amplifier Amp3 outputs the high-level gate low voltage VGL_H by adding the low-level gate low voltage VGL_L and the reference gate low voltage deviation ΔVGL_ref applied to the non-inverting input node (+).

The fourth amplifier Amp4 of the low-level gate low voltage generation circuit receives the low-level reference gate low voltage VGL_L_ref applied to the non-inverting input node (+) thereof, and the output node thereof is fed back to the inverting input node (−). The low-level reference gate low voltage VGL_L_ref is a reference voltage by which the low-level gate low voltage VGL_L is generated. As a result, the fourth amplifier Amp4 serves as a buffer and outputs the low-level gate low voltage VGL_L. The low-level gate low voltage VGL_L is applied to the non-inverting input node (+) of the third amplifier Amp3 via the resistor R.

Accordingly, the second multiplexer MUX2 receives and sequentially outputs the high-level gate low voltage VGL_H output from the third amplifier Amp3 and the low-level gate low voltage VGL_L output from the fourth amplifier Amp4. Since the high-level gate low voltage VGL_H applied to the second multiplexer MUX2 is generated using the low-level gate low voltage VGL_L, the high-level gate low voltage VGL_H is dependent on the low-level gate low voltage VGL_L, and thus, the deviation ΔVGL in the gate low voltage output through the second multiplexer MUX2 only includes the offset offset3 of the third amplifier Amp3.

In other words, since the trimming circuit 370 supplies the reference gate low voltage deviation ΔVGL_ref to the gate low voltage output circuit 366 using the high-level common voltage Vcom_H and the low-level common voltage Vcom_L generated by the common voltage output circuit 362 and the gate low voltage output circuit 366 generates the high-level gate low voltage VGL_H using the low-level gate low voltage VGL_L output from the fourth amplifier Amp4, the offset included in the gate low voltage deviation ΔVGL only includes the offset offset3 of the third amplifier Amp3.

Accordingly, the common voltage deviation ΔVcom and the gate low voltage deviation ΔVGL may be further reduced.

In addition, as described above, the common voltage output circuit 362 may set the high-level common voltage Vcom_H and the low-level common voltage Vcom_L to be dependent on each other.

Figure 12:
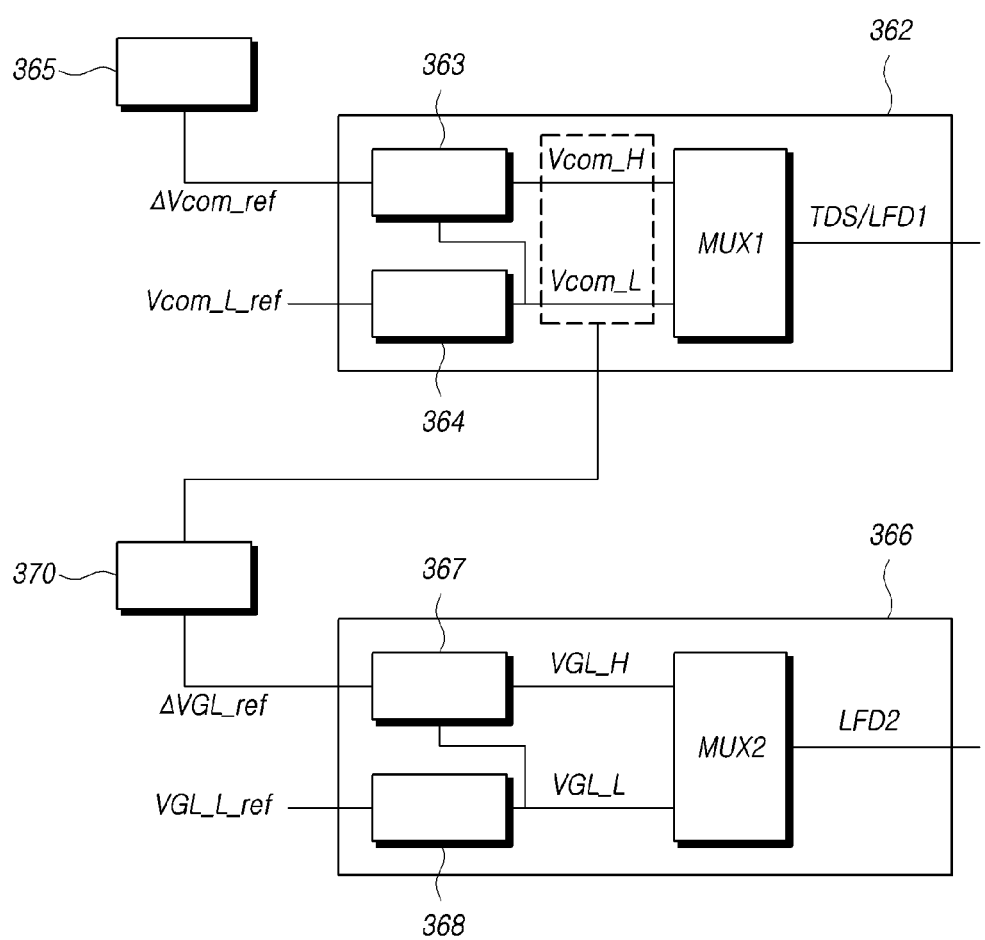
FIG. 12 is a block diagram illustrating the touch power IC of the touch display device according to another embodiment in a case in which a high-level common voltage and a low-level common voltage of the common voltage output circuit are set to be dependent on each other.

FIG. 12 is a block diagram illustrating the touch power IC of the touch display device according to one or more embodiments in a case in which a high-level common voltage and a low-level common voltage of the common voltage output circuit are set to be dependent on each other.

Referring to FIG. 12, in the touch power IC according to one or more embodiments, the configuration of the gate low voltage output circuit 366 is the same as that illustrated in FIG. 11. A high-level common voltage generation circuit 363 of the common voltage output circuit 362 generates the high-level common voltage Vcom_H by receiving the low-level common voltage Vcom_L from a low-level common voltage generation circuit 364.

In this regard, a circuit 365 outputting the reference common voltage deviation ΔVcom ref may be further included. The circuit outputting the reference common voltage deviation ΔVcom ref generates the reference common voltage deviation ΔVcom ref by subtracting the low-level reference common voltage Vcom_L_ref from the high-level reference common voltage Vcom_H_ref and applies the reference common voltage deviation ΔVcom ref to the high-level common voltage generation circuit 363.

In addition, the trimming circuit 370 may generate the reference common voltage deviation ΔVcom ref, to be applied to the common voltage output circuit 362, using the gate low voltage VGL generated by the gate low voltage output circuit 366.

Figure 13:
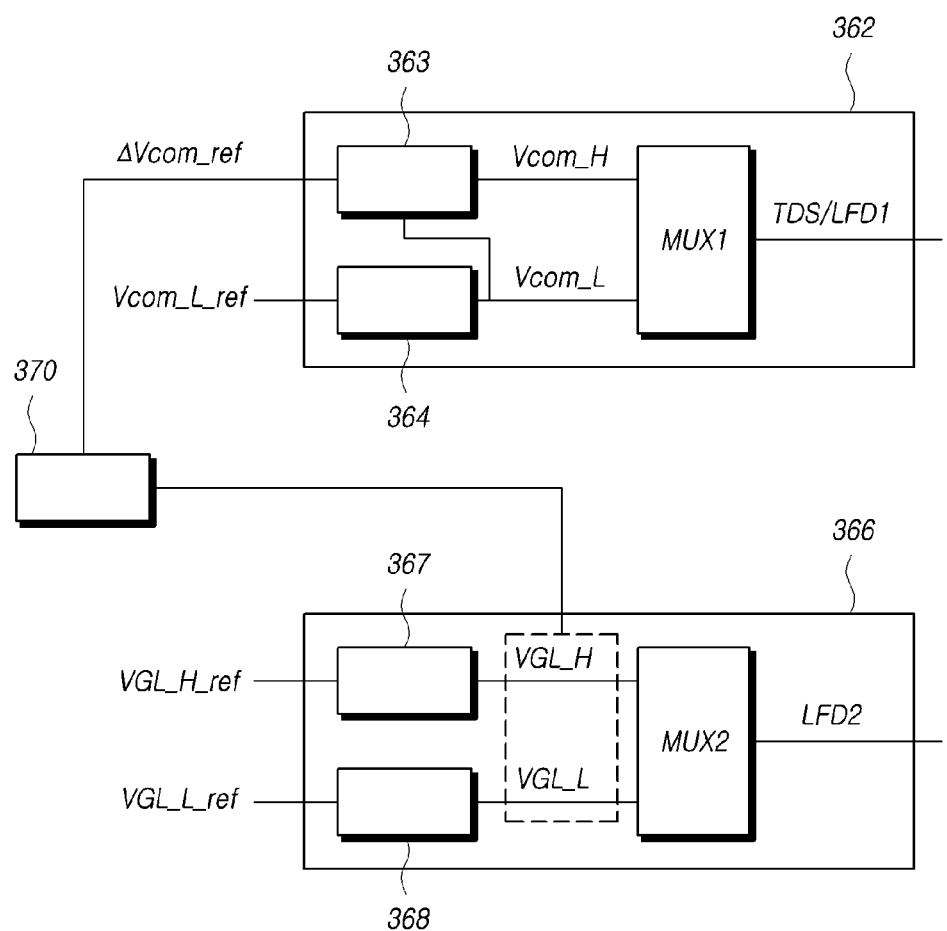
FIG. 13 is a block diagram illustrating the touch power IC of the touch display device according to one or more embodiments in a case in which the reference common voltage deviation is applied to the common voltage output circuit using the gate low voltage generated by the gate low voltage output circuit.

FIG. 13 is a block diagram illustrating the touch power IC of the touch display device according to one or more embodiments in a case in which the reference common voltage deviation is applied to the common voltage output circuit using the gate low voltage generated by the gate low voltage output circuit.

Referring to FIG. 13, the trimming circuit 370 generates the reference common voltage deviation ΔVcom ref using the high-level gate low voltage VGL_H and the low-level gate low voltage VGL_L generated by the gate low voltage output circuit 366.

Here, the trimming circuit 370 may generate the gate low voltage deviation ΔVGL corresponding to a difference between the high-level gate low voltage VGL_H and the low-level gate low voltage VGL_L, generated by the gate low voltage output circuit 366, as an output signal.

Accordingly, it may be necessary to adjust the output signal of the trimming circuit 370 into the reference common voltage deviation ΔVcom ref to be applied to the common voltage output circuit 362. This may be enabled by controlling the high-level reference gate low voltage VGL_H_ref and the low-level reference gate low voltage VGL_L_ref applied to the gate low voltage output circuit 366.

In addition, as described above, the gate low voltage output circuit 366 may set the high-level gate low voltage VGL_H and the low-level gate low voltage VGL_L to be dependent on each other or independent of each other.

Figure 14:
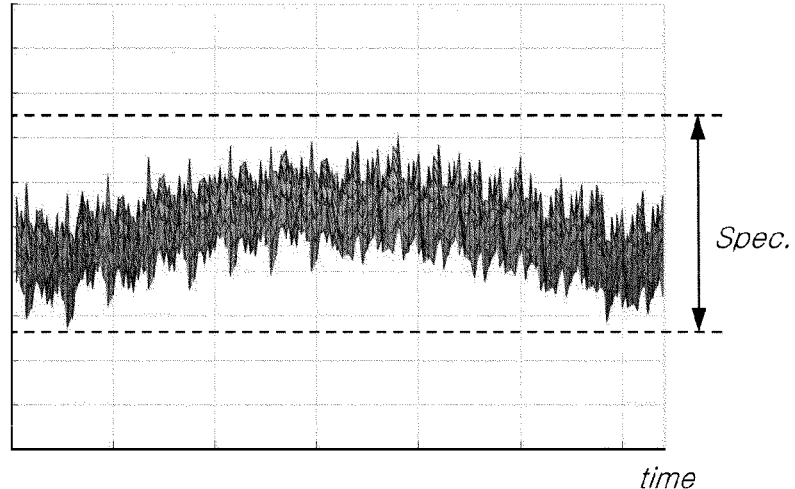
FIG. 14 is a graph illustrating an example of deviations in a common voltage and a gate low voltage generated by the touch power IC in the touch display device according to an embodiment.

FIG. 14 is a graph illustrating an example of deviations in a common voltage and a gate low voltage generated by the touch power IC in the touch display device according to an embodiment.

Referring to FIG. 14, the touch power IC of the touch display device according to embodiments may minimize (or reduce) deviations in the amplitude between the touch driving signal TDS and the load-free driving signal LFD and improve touch performance, since only one or two offsets are included between the common voltage deviation ΔVcom and the gate low voltage deviation ΔVGL.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure.

In other words, the various embodiments described above can be combined to provide further embodiments. Further changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A touch display device comprising:
a display panel, with a touchscreen panel including a plurality of touch electrodes being embedded therein;
a gate driving circuit supplying a gate signal to a plurality of gate lines;
a data driving circuit supplying a data signal to a plurality of data lines;
a touch driving circuit supplying a touch driving signal to the display panel and performing touch sensing in accordance with a signal received in response to the touch driving signal; and
a touch power integrated circuit including at least one of a common voltage output circuit generating the touch driving signal to be applied to the touch electrodes and a first alternating signal to be applied to the data lines during a touch sensing period in which the touch sensing is performed and a gate low voltage output circuit generating a second alternating signal to be applied to the gate lines during the touch sensing period,
wherein when the touch power integrated circuit includes the common voltage output circuit, the common voltage output circuit includes:
a low-level common voltage generation circuit generating a low-level common voltage;
a high-level common voltage generation circuit generating a high-level common voltage; and
a first multiplexer outputting the first alternating signal in response to the high-level common voltage and the low-level common voltage, and wherein the low-level common voltage generation circuit generates the low-level common voltage by receiving the high-level common voltage or the high-level common voltage generation circuit generates the high-level common voltage by receiving the low-level common voltage;
wherein when the touch power integrated circuit includes the gate low voltage output circuit, the gate low voltage output circuit includes:
a low-level gate low voltage generation circuit generating a low-level gate low voltage;
a high-level gate low voltage generation circuit generating a high-level gate low voltage; and
a second multiplexer outputting the second alternating signal in response to the high-level gate low voltage and the low-level gate low voltage, and wherein the low-level gate low voltage generation circuit generates the low-level gate low voltage by receiving the high-level gate low voltage or the high-level gate low voltage generation circuit generates the high-level gate low voltage by receiving the low-level gate low voltage.

2. The touch display device according to claim 1, wherein when the touch power integrated circuit includes the common voltage output circuit, the low-level common voltage generation circuit includes a first common voltage amplifier,
wherein a low-level reference common voltage is applied to a non-inverting input node of the first common voltage amplifier via a first resistor, and an output signal of the first common voltage amplifier is fed back to an inverting input node of the first common voltage amplifier, and
the output signal of the first common voltage amplifier is applied to the high-level common voltage generation circuit;
wherein when the touch power integrated circuit includes the gate low voltage output circuit, the low-level gate low voltage generation circuit includes a first gate low voltage amplifier,
wherein a low-level reference gate low voltage is applied to a non-inverting input node of the first gate low voltage amplifier via a second resistor, and an output signal of the first gate low voltage amplifier is fed back to an inverting input node of the first gate low voltage amplifier, and
the output signal of the first gate low voltage amplifier is applied to the high-level gate low voltage generation circuit.

3. The touch display device according to claim 2, wherein when the touch power integrated circuit includes the common voltage output circuit, the high-level common voltage generation circuit includes a second common voltage amplifier,
wherein an inverting input node of the second common voltage amplifier is grounded via a third resistor, and an output signal of the second common voltage amplifier is fed back to the inverting input node of the second common voltage amplifier via a fourth resistor, and
the output signal of the first common voltage amplifier is applied to a non-inverting input node of the second common voltage amplifier via a fifth resistor and the deviation in the reference common voltage corresponding to the difference between a high-level reference common voltage and the low-level reference common voltage is applied to the non-inverting input node of the second common voltage amplifier via a sixth resistor;
wherein when the touch power integrated circuit includes the gate low voltage output circuit, the high-level gate low voltage generation circuit includes a second gate low voltage amplifier,
wherein an inverting input node of the second gate low voltage amplifier is grounded via a seventh resistor, and an output signal of the second gate low voltage amplifier is fed back to the inverting input node of the second gate low voltage amplifier via an eighth resistor, and
the output signal of the first gate low voltage amplifier is applied to a non-inverting input node of the second gate low voltage amplifier via a ninth resistor and the deviation in the reference gate low voltage corresponding to the difference between a high-level reference gate low voltage and the low-level reference gate low voltage is applied to the non-inverting input node of the second gate low voltage amplifier via a tenth resistor.

4. The touch display device according to claim 3, wherein when the touch power integrated circuit includes the common voltage output circuit, the deviation in the reference common voltage is generated by a third common voltage amplifier, the third common voltage amplifier being configured that
the low-level reference common voltage is applied to an inverting input node of the third common voltage amplifier via a eleventh resistor and an output signal of the third common voltage amplifier is fed back to the inverting input node of the third common voltage amplifier via a twelfth resistor, and
a non-inverting input node of the third common voltage amplifier receives the high-level reference common voltage applied thereto via a thirteenth resistor and is grounded via fourteenth resistor;

wherein when the touch power integrated circuit includes the gate low voltage output circuit, the deviation in the reference gate low voltage is generated by a third gate low voltage amplifier, the third gate low voltage amplifier being configured that the low-level reference gate low voltage is applied to an inverting input node of the third gate low voltage amplifier via a fifteenth resistor and an output signal of the third gate low voltage amplifier is fed back to the inverting input node of the third gate low voltage amplifier via a sixteenth resistor, and a non-inverting input node of the third gate low voltage amplifier receives the high-level reference gate low voltage applied thereto via a seventeenth resistor and is grounded via another resistor.

5. The touch display device according to claim 1, wherein when the touch power integrated circuit includes the common voltage output circuit, the high-level common voltage generation circuit includes a first common voltage amplifier, wherein a high-level reference common voltage is applied to a non-inverting input node of the first common voltage amplifier via a first resistor, and an output signal of the first common voltage amplifier is fed back to an inverting input node of the first common voltage amplifier, and the output signal of the first common voltage amplifier is applied to the low-level common voltage generation circuit;

wherein when the touch power integrated circuit includes the gate low voltage output circuit, the high-level gate low voltage generation circuit includes a first gate low voltage amplifier, wherein a high-level reference gate low voltage is applied to a non-inverting input node of the first gate low voltage amplifier via a second resistor, and an output signal of the first gate low voltage amplifier is fed back to an inverting input node of the first gate low voltage amplifier, and the output signal of the first gate low voltage amplifier is applied to the low-level gate low voltage generation circuit.

6. The touch display device according to claim 5, wherein when the touch power integrated circuit includes the common voltage output circuit, the low-level common voltage generation circuit includes a second common voltage amplifier, wherein an output signal of the second common voltage amplifier is applied to an inverting input node of the second common voltage amplifier via a third resistor and a low-level reference common voltage is applied to the inverting input node of the second common voltage amplifier via a fourth resistor, and the output signal of the first common voltage amplifier is applied to a non-inverting input node of the second common voltage amplifier via a fifth resistor and a deviation in the reference common voltage corresponding to the difference between the high-level reference common voltage and the low-level reference common voltage is applied to the non-inverting input node of the second common voltage amplifier via a sixth resistor;

wherein when the touch power integrated circuit includes the gate low voltage output circuit, the low-level gate low voltage generation circuit includes a second gate low voltage amplifier, wherein an output signal of the second gate low voltage amplifier is applied to an inverting input node of the second gate low voltage amplifier via a seventh resistor and a low-level reference gate low voltage is applied to the inverting input node of the second gate low voltage amplifier via an eighth resistor, and the output signal of the first gate low voltage amplifier is applied to a non-inverting input node of the second gate low voltage amplifier via a ninth resistor and a deviation in the reference gate low voltage corresponding to the difference between the high-level reference gate low voltage and the low-level reference gate low voltage is applied to the non-inverting input node of the second gate low voltage amplifier via a tenth resistor.

7. The touch display device according to claim 6, wherein when the touch power integrated circuit includes the common voltage output circuit, the deviation in the reference common voltage is generated by a third common voltage amplifier, the third common voltage amplifier being configured that the low-level reference common voltage is applied to an inverting input node of the third common voltage amplifier and an output node of the third common voltage amplifier is fed back to the inverting input node of the third common voltage amplifier, and a non-inverting input node of the third common voltage amplifier receives the high-level reference common voltage applied thereto and is grounded;

wherein when the touch power integrated circuit includes the gate low voltage output circuit, the deviation in the reference gate low voltage is generated by a third gate low voltage amplifier, the third gate low voltage amplifier being configured that the low-level reference gate low voltage is applied to an inverting input node of the third gate low voltage amplifier and an output node of the third gate low voltage amplifier is fed back to the inverting input node of the third gate low voltage amplifier, and a non-inverting input node of the third gate low voltage amplifier receives a high-level reference gate low voltage applied thereto and is grounded.

8. A driving circuit of a touch display device comprising:

a touch power integrated circuit including at least one of a common voltage output circuit generating a touch driving signal to be applied to a plurality of touch electrodes and a first signal to be applied to a plurality of data lines during a touch sensing period in which the touch sensing is performed and a gate low voltage output circuit generating a second signal to be applied to a plurality of gate lines during the touch sensing period, wherein when the touch power integrated circuit includes the common voltage output circuit, the common voltage output circuit includes:

a low-level common voltage generation circuit generating a low-level common voltage;

a high-level common voltage generation circuit generating a high-level common voltage; and a first multiplexer outputting the first signal in an alternating signal waveform based on the high-level common voltage and the low-level common voltage, and wherein the low-level common voltage generation circuit generates the low-level common voltage by receiving the high-level common voltage or the high-level common voltage generation circuit generates the high-level common voltage by receiving the low-level common voltage;

wherein when the touch power integrated circuit includes the gate low voltage output circuit, the gate low voltage output circuit includes:

a low-level gate low voltage generation circuit generating a low-level gate low voltage;
a high-level gate low voltage generation circuit generating a high-level gate low voltage; and
a second multiplexer outputting the second signal in the alternating signal waveform based on the high-level gate low voltage and the low-level gate low voltage, and wherein the low-level gate low voltage generation circuit generates the low-level gate low voltage by receiving the high-level gate low voltage or the high-level gate low voltage generation circuit generates the high-level gate low voltage by receiving the low-level gate low voltage.

9. A touch display device comprising:
a display panel, with a touchscreen panel including a plurality of touch electrodes being embedded therein;
a gate driving circuit supplying a gate signal to a plurality of gate lines;
a data driving circuit supplying a data signal to a plurality of data lines;
a touch driving circuit supplying a touch driving signal to the display panel and performing touch sensing in accordance with a signal received in response to the touch driving signal; and
a touch power integrated circuit supplying a signal for the touch sensing to the touch driving circuit,
wherein the touch power integrated circuit includes:
a common voltage output circuit generating the touch driving signal to be applied to the touch electrodes and a first alternating signal to be applied to the data lines during a touch sensing period in which the touch sensing is performed;
a gate low voltage output circuit generating a second alternating signal to be applied to the gate lines during the touch sensing period; and
a trimming circuit applying a deviation in a reference gate low voltage to the gate low voltage output circuit using a common voltage generated by the common voltage output circuit or applying the deviation in the reference common voltage to the common voltage output circuit using a gate low voltage generated by the gate low voltage output circuit.

10. The touch display device according to claim 9, wherein the trimming circuit includes an amplifier, the amplifier being configured that
a low-level common voltage generated by the common voltage output circuit is applied to an inverting input node of the amplifier via a first resistor,
an output signal of the amplifier is fed back to the inverting input node of the amplifier, and
a high-level common voltage generated by the common voltage output circuit is applied to a non-inverting input node of the amplifier via a second resistor and a non-inverting input node of the amplifier is grounded via a third resistor.

11. The touch display device according to claim 9, wherein the trimming circuit includes an amplifier, the amplifier being configured that
a low-level gate low voltage generated by the gate low voltage output circuit is applied to an inverting input node of the amplifier via a first resistor,
an output signal of the amplifier is fed back to the inverting input node of the amplifier, and
a high-level gate low voltage generated by the gate low voltage output circuit is applied to a non-inverting input node of the amplifier via a second resistor and a non-inverting input node of the amplifier is grounded via a third resistor.

\* \* \* \* \*